US010028087B2

(12) United States Patent
Haapanen et al.

(10) Patent No.: US 10,028,087 B2
(45) Date of Patent: Jul. 17, 2018

(54) LOCATING AND TRACKING MISSING OR RELOCATED DEVICES

(71) Applicants: Tom Haapanen, Kitchener (CA); Matt Cecile, Waterloo (CA)

(72) Inventors: Tom Haapanen, Kitchener (CA); Matt Cecile, Waterloo (CA)

(73) Assignee: RICOH COMPANY, LTD., Tokyo (JP)

( * ) Notice: Subject to any disclaimer, the term of this patent is extended or adjusted under 35 U.S.C. 154(b) by 289 days.

(21) Appl. No.: 15/090,510

(22) Filed: Apr. 4, 2016

(65) Prior Publication Data
US 2017/0289750 A1    Oct. 5, 2017

(51) Int. Cl.
G08B 1/08        (2006.01)
H04W 4/02       (2018.01)
H04W 4/00       (2018.01)
G08B 13/24      (2006.01)
H04W 4/80       (2018.01)

(52) U.S. Cl.
CPC .......... H04W 4/02 (2013.01); G08B 13/2462 (2013.01); H04W 4/008 (2013.01); H04W 4/80 (2018.02)

(58) Field of Classification Search
CPC ......... H04W 4/02; H04W 4/80; H04W 4/008; G08B 13/2462
See application file for complete search history.

(56) References Cited

U.S. PATENT DOCUMENTS

| 6,314,460 | B1  | 11/2001 | Knight et al. |
| 7,080,778 | B1* | 7/2006 | Kressin ................. G06Q 10/06 |
|           |     |        | 235/385 |
| 7,945,251 | B2* | 5/2011 | Jendbro ............ H04L 29/12066 |
|           |     |        | 340/573.1 |
| 8,891,106 | B1  | 11/2014 | Haapanen |
| 9,122,433 | B2  | 9/2015 | Haapanen |
| 9,130,838 | B2  | 9/2015 | Anderson et al. |
| 9,489,154 | B1* | 11/2016 | Haapanen ............. G06F 3/1203 |
| 9,516,473 | B1* | 12/2016 | Haapanen ............. H04W 4/029 |

(Continued)

OTHER PUBLICATIONS

U.S. Appl. No. 15/166,193, Tom Haapanen Tom Mulholland, Configuring Devices Using Device Management Templates, Pending.

(Continued)

Primary Examiner — Quang D Pham
(74) Attorney, Agent, or Firm — Cooper & Dunham LLP

(57) ABSTRACT

Host terminals of a device management application (or other mobile application) are configured to obtain a missing devices list from a device management server, and to communicate, via short-range point-to-point communication with an output device, when the output device is within a short-range communication range threshold, to obtain a device identifier of the output device. The device management application compares the device identifier of the output device with device identifiers on the missing devices list, and when such comparison indicates that the output device corresponds to a missing device, marks the output device as a missing device in a tracked device record, and records an approximated location of the output device in the tracked device record. When connected to the device management server, the device management application transmits the tracked device record to the device management server.

20 Claims, 24 Drawing Sheets

(56) References Cited

U.S. PATENT DOCUMENTS

| | | | |
|---|---|---|---|
| 9,565,519 B2* | 2/2017 | Liu | H04W 4/02 |
| 2003/0146929 A1 | 8/2003 | Baldwin et al. | |
| 2008/0204233 A1* | 8/2008 | Agrawal | G06Q 10/08 |
| | | | 340/572.1 |
| 2008/0309965 A1 | 12/2008 | Scaff | |
| 2009/0033984 A1* | 2/2009 | Sahashi | G06F 21/608 |
| | | | 358/1.15 |
| 2012/0258701 A1* | 10/2012 | Walker | H04W 4/029 |
| | | | 455/419 |
| 2012/0265865 A1 | 10/2012 | Tanaka et al. | |
| 2012/0266073 A1 | 10/2012 | Tanaka et al. | |
| 2013/0165157 A1* | 6/2013 | Mapes | H04W 4/029 |
| | | | 455/456.5 |
| 2014/0022587 A1* | 1/2014 | Coccia | G01S 19/14 |
| | | | 358/1.15 |
| 2014/0154986 A1 | 6/2014 | Lee et al. | |
| 2014/0222980 A1 | 8/2014 | Hagiwara et al. | |
| 2014/0223325 A1 | 8/2014 | Melendez et al. | |
| 2014/0344446 A1* | 11/2014 | Rjeili | H04L 43/04 |
| | | | 709/224 |
| 2016/0014555 A1* | 1/2016 | Michishita | H04W 4/02 |
| | | | 340/539.32 |

OTHER PUBLICATIONS

U.S. Appl. No. 15/166,193 of Tom Haapanen et al. filed May 26, 2016.

U.S. Appl. No. 13/086,608, Shun Tanaka Tom Haapanen Jim Vopni, Device Management System, Pending (US 2012/0265865 A1).

U.S. Appl. No. 13/086,779, Shun Tanaka Tom Haapanen Jim Vopni, Device Management System Including Reporting Server, Pending (US 2012/0266073 A1).

U.S. Appl. No. 13/758,082, Kenji Hagiwara Tom Haapanen Arturo Hung Tse, Device Management Apparatus, System and Method Including Remote Configuration of Device Preference Settings, Pending (US 2014/0222980 A1).

U.S. Appl. No. 13/758,116, Greg Melendez Tom Haapanen, Dynamic User Interface for Device Management System, Pending (US 2014/0223325 A1).

U.S. Appl. No. 13/758,110, Greg Anderson Tom Haapanen Kenji Hagiwara, Device Management System, Apparatus and Method Configured for Customizing a Power Filter, Patented (U.S. Pat. No. 9,130,838).

U.S. Appl. No. 13/855,083, Tom Haapanen, Click-To-Print System, Apparatus and Method, Patented (U.S. Pat. No. 9,122,433).

U.S. Appl. No. 13/924,798, Tom Haapanen, Access Control System and Method for Mobile Printing, Patented (U.S. Pat. No. 8,891,106).

U.S. Appl. No. 14/735,251, Tom Haapanen Qinlei Fan, Offline Mobile Capture, pending.

U.S. Appl. No. 14/326,978, Tom Haapanen Matt Cecile, System, Apparatus and Method for Secure Operation of Image Forming Device, pending.

U.S. Appl. No. 14/934,093, Tom Haapanen Matt Cecile, System, Apparatus and Method for Tracking and Managing Devices, pending.

U.S. Appl. No. 15/015,619, Tom Haapanen Matt Cecile, System, Apparatus and Method for Easy Access to Casual or Guest Printing, pending.

U.S. Appl. No. 15/088,901, Tom Haapanen, System, Apparatus and Method Configured to Detext, Analyze and/or Report Impact to Output Device, pending.

U.S. Appl. No. 15/090,124, Tom Haapanen Matt Cecile, Device Management Based on Tracking Path Taken by User, pending.

U.S. Appl. No. 14/735,251 of Tom Haapanen et al., filed Jun. 10, 2015.

U.S. Appl. No. 14/926,978 of Tom Haapanen et al., filed Oct. 29, 2015.

U.S. Appl. No. 14/934,093 of Tom Haapanen et al., filed Nov. 5, 2015.

U.S. Appl. No. 15/015,619 of Tom Haapanen et al., filed Feb. 4, 2016.

U.S. Appl. No. 15/088,901 of Tom Haapanen, filed Apr. 1, 2016.

U.S. Appl. No. 15/090,124 of Tom Haapanen et al., filed Apr. 4, 2016.

European search report dated Aug. 31, 2017 in connection with corresponding European patent application No. 17161566.9.

* cited by examiner

| Missing Devices List |||||||
| --- | --- | --- | --- | --- | --- |
| Name | Device Identifier | Device Model | Device Manufacturer | Date Missing | Last Detected Location |
| Engineering | UY780 | Replicator | HIJ | 03/15/2016 | Basement |
| Sammy's | 8DKF09 | Mach I | EFG | 03/08/2016 | Hallway 23 |
| Accounting | B30KLW | Artisan | LMN | 03/23/2016 | Room 45 |
| Lobby | 46LCXR | Express | XYZ | 03/20/2016 | Conf Room A |
| Management | IFDSDF4 | Aficio | Ricoh | 03/16/2016 | Office 34 |

Fig. 5

| Tracked Device Record |||||||
| --- | --- | --- | --- | --- | --- | --- |
| Name | Device Identifier | Device Model | Device Manufacturer | Timestamp | Location | Missing? |
| Shared Printer | DF9ERG | Regnum | Ricoh | 02/23/2016 2:34 PM | Hallway 24 | No |
| Guest | AIEOR98 | MPC | Ricoh | 03/30/2016 5:01 AM | Lobby | No |
| Jack's | XFIUER7 | Vision | EFG | 03/15/2016 3:45 PM | Office 45 | No |
| Mailroom | DKLFGD | Colorium | ABC | 03/03/2016 10:14 PM | Mailroom | Yes |
| Kitchen | KJGU74 | Mach II | Ricoh | 02/29/2016 12:00 AM | Pantry | No |

Fig. 6

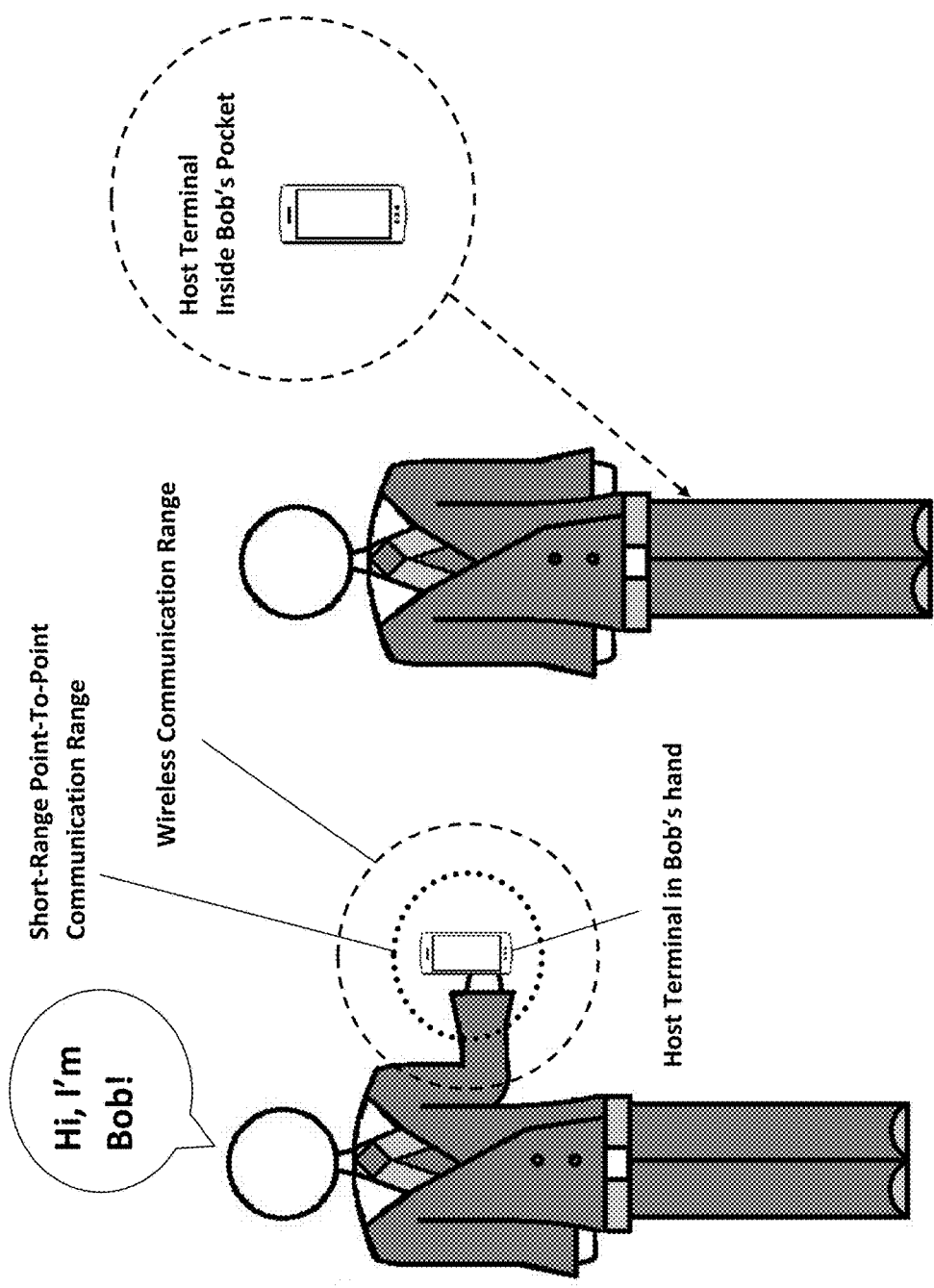

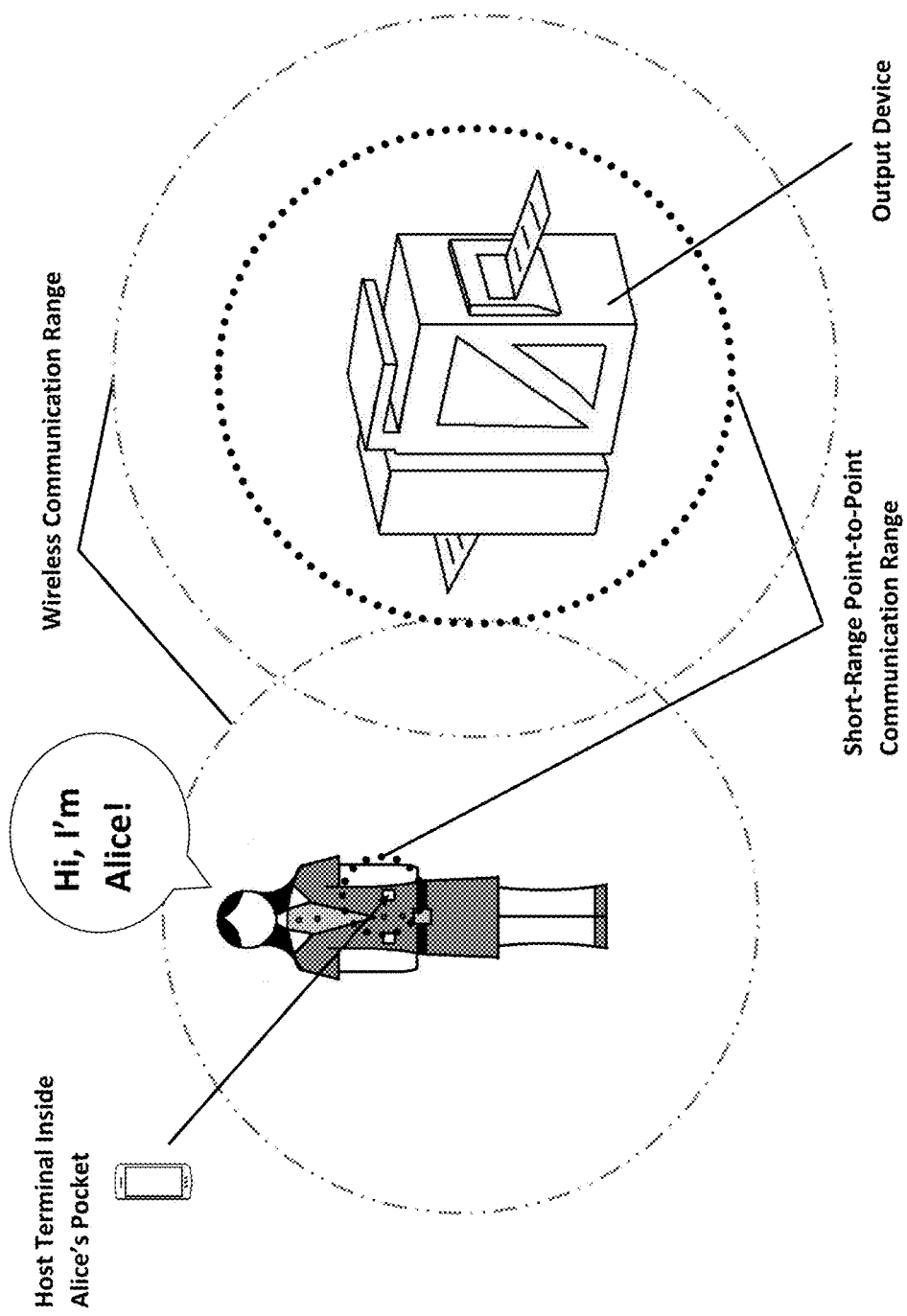

LOCATING AND TRACKING MISSING OR RELOCATED DEVICES

TECHNICAL FIELD

This disclosure relates to systems, apparatuses, applications and methodologies, to facilitate a process to identify, record and track missing or relocated devices in a system, and more specifically, to such tools (for example, a system, an apparatus, application software, a method, etc.) that enable a host terminal of a device management application (or other mobile application) to facilitate such process based on a missing devices list obtained from a device management server.

BACKGROUND

In the current information age, information technology (IT) tools play a significant role in our daily activities, and there are often discussions of the desirableness of a paperless society. However, notwithstanding such discussions, there remains a need by users of computers and other information terminals (that is, any of the various conventional devices which may have a need to print on demand, such as personal computers, notebook computers, workstations, other types of computers, kiosks, PDAs, other information appliances, etc.) for printing functionality. Therefore, output devices having printing or plotting functionality, such as printers, copiers, multi-function peripheral (MFP) devices, etc., continue to play a significant role at home, at work and even elsewhere.

Since output devices and other IT assets continue to proliferate, device management tools are extensively used in enterprises and other organizations in order to manage a fleet of devices (such as multi-function devices, printers, etc.) and other IT assets, and perform tasks such as applying fleet-wide settings, install software, firmware updates, application updates, etc.

On the other hand, devices are often configured for plug-and-play, that is, the device is configured to connect automatically to an available network connection, without manual setting by an authorized administrator. Thus, in an office environment, a user can move a device from one location to another location, and in some instances, even deploy a new device, without an administrator and without authorization. As an example, a common problem for network administrators is not being informed when an MFP device or another output device is physically moved from one location to another. For example, when a printer or MFP has wheels, it can be easily pushed or dragged to move it to another location. When a device is moved without knowledge of the administrator, support and maintenance of the device becomes very difficult since the device cannot be located by the administrator or support staff.

There remains a need for improved provisions in a device (and/or asset) management system to detect and track devices moved in an enterprise, office or other environment.

SUMMARY

Various tools (for example, a system, an apparatus, application software, a method, etc.) can be provided to facilitate identifying, recording and tracking missing or relocated devices. Any one or more of various aspects discussed herein may be included.

For example, a device management application (or another mobile application) on a host terminal may be configured to obtain a missing devices list from a device management server, and to communicate, via short-range point-to-point communication with an output device, when the output device is within a short-range communication range threshold, to obtain a device identifier of the output device. The application compares the device identifier of the output device with device identifiers on the missing devices list, and when such comparison indicates that the output device corresponds to a missing or relocated device, marks the output device as a missing device in a tracked device record, and records an approximated location of the output device in the tracked device record. When connected to the device management server, the application transmits the tracked device record to the device management server. Such approach may be performed in an automated manner, transparent to the user, or may be made to be semi-automated, requesting some user interaction, when the missing or relocated device has been located.

As another example, the mobile application may be configured to record a timestamp and a device identifier of a detected output device, in addition to the approximated location of the output device, in a tracked device record. Further, the application may be configured to record, when the application determines that the output device corresponds to a missing or relocated device, identifiers of other output devices within the short-range communication range threshold of the host terminal, in addition to the timestamp, in the tracked device record of the output device.

In another aspect, the mobile application may be configured to record, when the application determines that an output device corresponds to a missing or relocated device, (i) an identifier of a most-recently detected other output device or beacon device detected prior to detection of the missing output device, and (ii) a timestamp difference between the timestamp associated with detection of the missing output device and the timestamp associated with detection of the other device, in the tracked device record of the output device.

In another aspect, the mobile application may be configured to track, and record in a tracked device record of an output device, the next N (N being a predetermined integer greater than zero) output devices detected through the short-range communication module after the application determines that the output device corresponds to a missing or relocated device.

In another aspect, the mobile application may be configured to include an application user interface to output to a user of the host terminal, when the application determines that a detected output device corresponds to a missing or relocated device, an alert that a device nearby corresponds to a missing or relocated device. Such application user interface may be configured to permit the user of the host terminal to acknowledge receipt of the alert, and when receipt of the alert is acknowledged, the application user interface displays information including an image of the missing or relocated device and the approximated location of the detected device. The application user interface (UI) may also be configured to permit the user to confirm that a device nearby is the missing or relocated device shown in the image. Further, when the user of the host terminal operates the application to confirm that the device nearby is the missing or relocated device shown in the image, the application transmits an immediate notification to an administrator to alert the administrator of the approximated location of such missing or relocated device. The application user interface may also display a message requesting the user of the host terminal to notify an administrator, based on specified contact information, of the output device corresponding to a missing or relocated device.

In another aspect, each time the mobile application connects to a device management server, the application may push tracked device records, if any, stored in the persistent local storage of the host terminal, to the device management server, and check the device management server for updates to the missing devices list.

In addition, a device management server may be configured to include various aspects. For example, in addition to maintaining a missing devices list (e.g., indicating, for each missing or relocated device, manufacturer, device model and device identifier of the missing or relocated device), the device management server may, each time the device management server receives a tracked device record corresponding to a missing or relocated device, compute an updated location of the missing or relocated device based on the information in the received tracked device record and other tracked device records received for such missing or relocated device from other devices.

In another aspect, a device management server may, when the device management server receives a tracked device record of an output device corresponding to a missing or relocated device, transmit an immediate notification to an administrator to alert the administrator of the approximated location of the output device corresponding to a missing device on the missing devices list.

In another aspect, a device management server may, based on a regular notification schedule or in response to request from a client terminal, transmit a summary of detected missing devices, including data consolidated from multiple host terminals.

In another aspect, each time a mobile application connects to a device management server, the device management server may push an updated missing devices list to the mobile application and obtain from the mobile application tracked device records, if any, stored in the persistent local storage of the host terminal hosting the mobile application.

Various other aspects, features and advantages may be included, as discussed infra.

BRIEF DESCRIPTION OF THE DRAWINGS

The aforementioned and other aspects, features and advantages can be more readily understood from the following detailed description with reference to the accompanying drawings wherein:

FIG. 5 shows an example of a missing devices list stored by a device management server or a host terminal;

FIG. 6 shows an example of a tracked device record stored by a device management server or a host terminal;

FIG. 12A-12E show notionally examples of interactions between a host terminal and an output device, in any of the systems of FIGS. 1A and 1B (or an equivalent);

DETAILED DESCRIPTION OF EMBODIMENTS

Figure 1A:
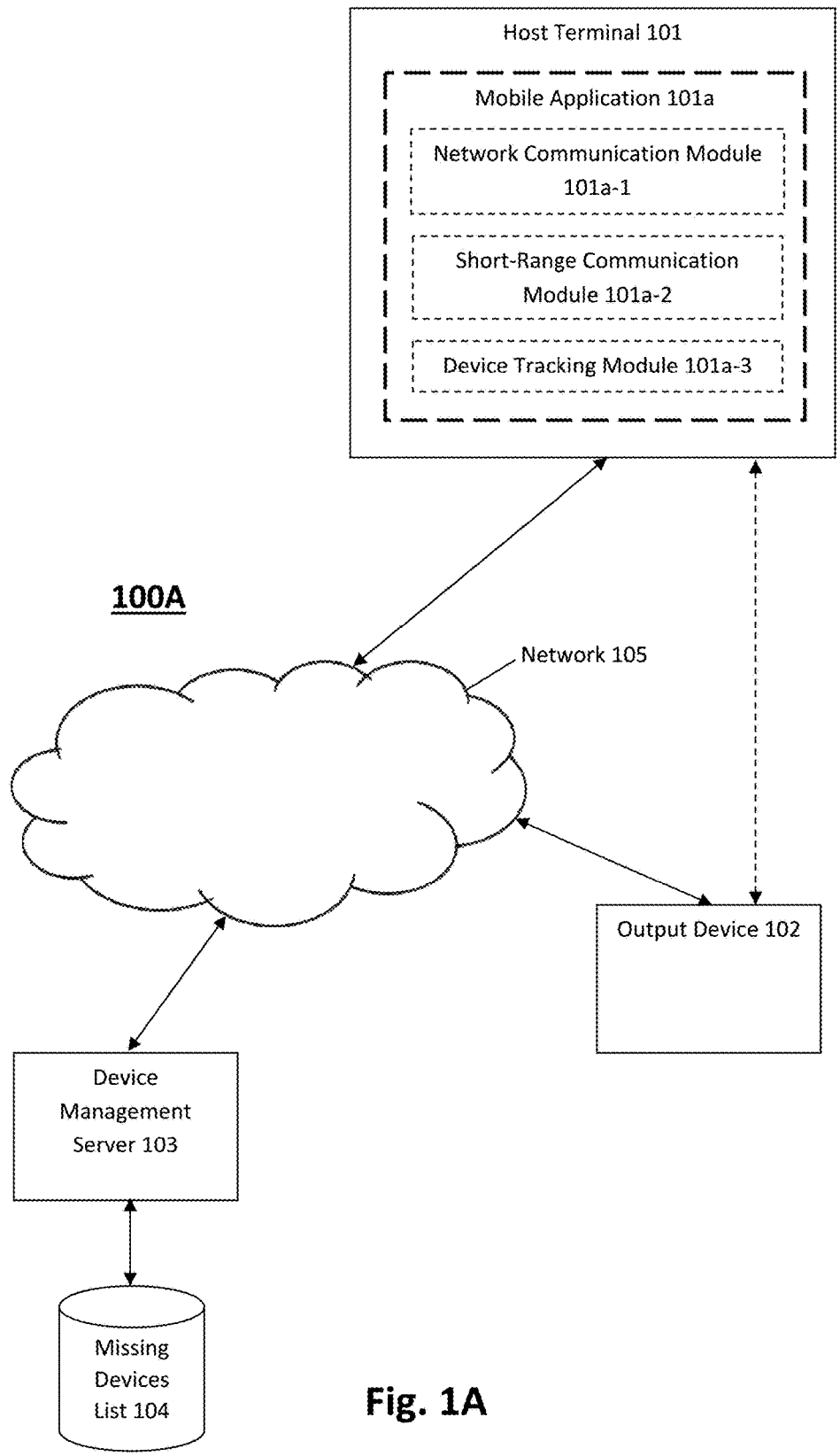
FIG. 1A shows a block diagram of a system including various provisions to identify, record and track relocated or missing output devices, according to an embodiment of this disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate identifying, recording and tracking missing or relocated devices are discussed herein, with reference to examples in which a mobile application is provided on a host terminal. It should be appreciated by those skilled in the art that any one or more of such tools may be embedded in the application and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1A shows schematically a system 100A that includes a host terminal 101, an output device 102 and a device management server 103, all of which are connected to network 105.

The host terminal 101 can be any computing device, including but not limited to a tablet or notebook computer, a PDA (personal digital assistant), a mobile phone or handset, another mobile information terminal, etc., that can communicate with other devices through the network 105.

The network communication module 101*a*-1 permits the host terminal 101 to communicate, via the network 105 (including a wife network and/or a mobile network), with the device management server 103 in order to access a missing devices list from the device management server 103. The missing devices list indicates devices (e.g., printer, scanner, fax machine, MFP, personal computer, notebook computer, tablet, etc.) that are misplaced or lost. When a device is missing, a user, administrator or other service or helpdesk personnel may upload information corresponding to the lost device, to be placed on the missing devices list. Thus, the missing devices list indicates which devices are currently not found (and/or cannot be found at the expected location). The missing devices list may include, for example, information such as manufacturer, device model, device identifier, device image, etc., corresponding to the missing device.

After receiving the missing devices list, the host terminal 101 stores it in persistent local storage of the host terminal. Further, the network communication module 101a-1 also allows the host terminal 101 to communicate with the output device 102 (or another output device) through the network 105, such as to submit an output job to the output device.

The short-range communication module 101a-2 allows the host terminal 101 to communicate with the output device 102 in a manner that is different from the network communication module 101a-1. The host terminal 101 uses the short-range communication module 101a-2 to communicate with the output device 102 when the output device 102 is within a short-range communication range of the host terminal 101. The short-range communication range is typically shorter than the wireless communication range of the host terminal 101. In other words, while the host terminal 101 may communicate via network 105 with the output device 102, and vice versa, the short-range communication module 101a-2 does not commence short-range communication with the output device 102 until the output device 102 is within the short-range communication range of the host terminal 101. Once the host terminal 101 is within short-range communication range threshold of the output device 102, the short-range communication module 101a-2 transmits a request for a device identifier (e.g., MAC address, IP address, registration number, serial number, etc.) corresponding to the output device 102. In response, the output device 102 communicates the device identifier to the short-range communication module 101a-2.

The device tracking module 101a-3 registers a timestamp and a device identifier of an output device (e.g., 102) that has been tracked by the device tracking module 101a-3, in a tracked device record which is stored in the persistent local storage of the host terminal 101. The tracked device record stores, for every output device 102 detected by short-range communication module 101a-2, a timestamp and a device identifier corresponding to each detected output device 102. In other words, when the host terminal 101 is within the short range communication range threshold of any output device 102, the short-range communication module 101a-2 automatically obtains from such output device 102 a device identifier of the output device 102. The device tracking module 101a-3 records such device identifier and generates and registers a timestamp by extracting the time at which the output device 102 was detected by the short-range communication module 101a-2, from an internal clock [not shown] on the host terminal 101.

After registering the device identifier and the timestamp in the tracked device record, the device tracking module 101a-3 compares the device identifier with the device identifiers in the missing devices list which was previously obtained by the network communication module 101a-1. If there is a match between the device identifier and one of the device identifiers in the missing devices list, the device tracking module 101a-3 records the output device 102 as one of the missing devices in the tracked device record, and registers a comparative location of the output device 102 in the tracked device record. The comparative location may be determined from the position of the host terminal 101. For example, the position of the host terminal 101 may be determined via a global positioning system (GPS) [not shown] on the host terminal 101. In another example, the position of the host terminal 101 may be determined by a plurality of hotspot devices which are (i) disposed throughout the location at which the user of the host terminal 101 is at and (ii) detects persons within that location.

It may be possible that an output device 102 may be detected by a host terminal 101 of user A at a specific point in time (timestamp A) and may be detected again by another host terminal 101 of user B at another point in time (timestamp B). In the case that such aforementioned scenario occurs, the device tracking module 101a-3 takes the timestamp difference between timestamp A and timestamp B (with timestamp B being a later time than timestamp A). Such timestamp difference is then stored by the device tracking module 101a-3 in the tracked device record.

For example, the host terminal 101 of user A may have detected an output device 102 on Jan. 3, 2016 (timestamp A), while the host terminal 101 of user B detected the same output device 102 on Feb. 3, 2016 (timestamp B). Thus, the device tracking module 101a-3 calculates the timestamp difference of Feb. 3, 2016 and Jan. 3, 2016 to be one month (or 31 days). By determining the timestamp difference, it can be determined whether the output device 102 is still at the same location. Since there may be multiple host terminals 101 detecting an output device 102 at different moments in time, a timestamp taken one week or one month ago may not necessarily indicate that the output device 102 is still at the location when the timestamp was taken. On the other hand, when multiple timestamps recorded by respective host terminals 101 are within short intervals of each other, it is likely that the output device 102 is still at that same location.

In another example embodiment, the device tracking module 101a-3 does not cease recording of missing devices in the tracked device record after detecting a missing device. Instead, the device tracking module 101a-3 tracks and registers the next N (N being a predetermined integer greater than zero) output devices that are detected via the short-range communication module 101a-2. In an example, the host terminal 101 may pass by an output device 102 which is discovered to be a missing output device 102. After registering the missing output device 102 into the tracked device record, the device tracking module 101a-3 tracks and records the next N (e.g., 1, 5, 11, 45, etc.) devices. In another example, after tracking and recording the next N devices, the device tracking module 101a-3 ceases to record any more output devices in the tracked device record.

The output device 102 may be, for example, an MFP, a printer, a facsimile machine, a scanner, etc. Further, the terms "printer" and "printer device" are used hereinafter generically to include any output device having a printing or plotting functionality, and include multifunction devices having a copy and/or scanning functionality in addition to the printing or plotting functionality.

The device management server 103 manages the missing devices list by registering missing devices on to the missing devices list and removing missing devices that have been found from the missing devices list. Whenever a user, administrator, or other personnel discovers that an output device is missing, such person makes reports (e.g., via a program) the missing device. Information (e.g., manufacturer, device model, device identifier, last known location, etc.) regarding the missing output device is then added by the device management server 103 to the missing devices list.

Further, the device management server 103 also communicates with the network communication module 101*a*-1 of the mobile application 101*a* in order to transmit the missing devices list to the host terminal 101. When the network communication module 101*a*-1 requests the missing devices list from the device management server 103, the device management server 103 communicates with the missing devices database 104. In response, the missing devices database 104 which stores the missing devices list, transmits the missing devices list to the device management server 103. In turn the device management server 103 forwards the missing devices list received from the missing devices database 104 to the network communication module 101*a*-1. After receiving the missing devices list, the host terminal 101 stores the missing device list in a persistent local storage of the host terminal 101. In an example embodiment, whenever there is a new missing output device 102 added to the missing devices list, the device management server 103 sends the updated missing devices list automatically to the host terminal 101. In another example embodiment, the host terminal 101 may periodically request the missing devices list from the device management server 103 regardless of whether the missing devices list has been updated or includes a change.

In addition to requesting and forwarding the missing devices list, the device management server 103 may also receive the tracked device record from the device tracking module 101*a*-3. In one example, the device tracking module 101*a*-3 may periodically push the tracked device record to the device management server 103. In another example, the device management server 103 may demand such tracked device record from the host terminal 101. In one example embodiment, once the device management server 103 receives the tracked device record, the device management server 103 may check for missing output devices in the tracked device record that has been marked as found. If any missing output devices were found, the device management server may communicate (e.g., e-mail, SMS, notifications, etc.) with the IT administrator to inform him or her of the output devices that were found. In another example embodiment, each time the device management server 103 receives the tracked device record that corresponds to a missing device on the missing devices list, the device management server 103 calculates the position of the missing device based on information obtained from the received tracked device record and other tracked device records received from other host terminals 101.

The missing devices database 104 includes the missing devices list in the form a table. In one case, whenever the device management server 103 is informed that there is a new output device 102 that is missing, the device management server 103 access the missing devices database 104 and updates the missing devices list. In another case, whenever the device management server 103 receives a request from the host terminal 101 for the missing devices list, the missing devices database 104 would transmit the missing devices list to the device management server 103 to be forwarded to the host terminal 101. Further, it should be noted that the missing devices database 104 may be disposed inside the device management server 103 or may be disposed at location remote from the device management server 103.

The network 105 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
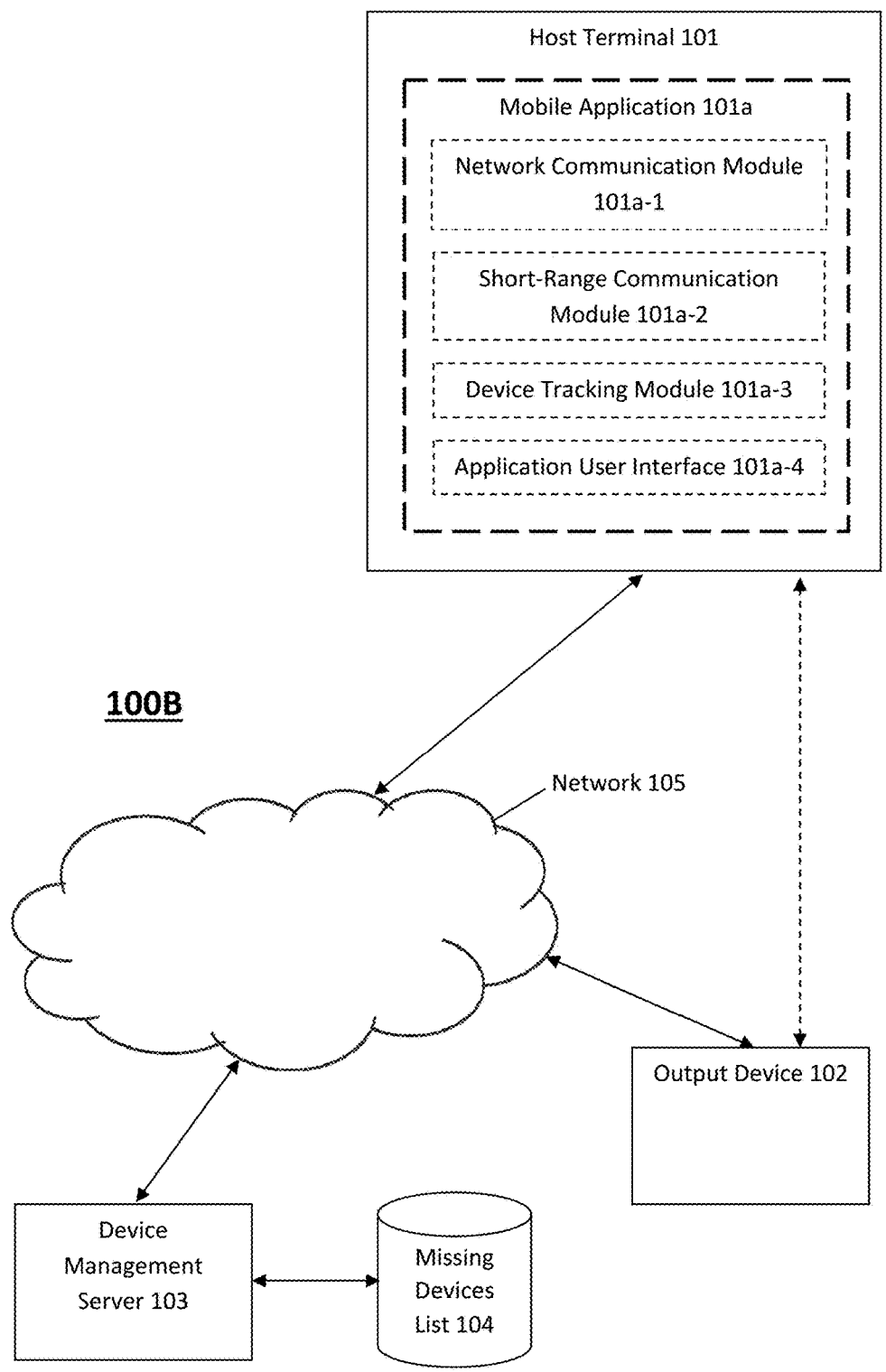
FIG. 1B shows a block diagram of a system including various provisions to identify, record and track relocated or missing output devices, according to another embodiment of this disclosure.

FIG. 1B shows schematically a system 100B for providing output (e.g., print, scan, copy, fax, etc.) services, according to another example embodiment. The system 100B is similar to the system 100A except that the system 100B additionally includes an application user interface 101*a*-4 in the mobile application 101*a*.

The application user interface 101*a*-4 alerts the user of the host terminal 101, (i) when the short-range communication module 101*a*-2 detects that there is an output device nearby and (ii) when the device tracking module 101*a*-3 determines that the detected output device corresponds to a missing device on the missing devices list stored locally on the host terminal 101, that a nearby output device (i.e. detected output device) corresponds to a missing output device on the missing devices list. When the host terminal 101 passes by an output device at a short-range communication range, the host terminal 101 determines whether that output device corresponds to one of the missing devices on the missing devices list. If that output device does indeed correspond to one of the missing devices, the host terminal 101 alerts the user via the application user interface 101*a*-4 that there is a missing device that is nearby to the user.

The alert by the application user interface 101*a*-4 to the user of the host terminal 101 may first indicate to the user that there is a missing device nearby. In the case that the user wishes to determine what/where the missing device is, he or she may acknowledge the alert. On the other hand, the user may not wish to determine what/where the missing device is. Thus, he or she may ignore or close the alert. In the case that the user acknowledges the alert, the application user interface 101*a*-4 presents to the user information (e.g., manufacturer, device model, size, weight, etc.) regarding the missing device that is nearby. In addition, the application user interface 101*a*-4 may also display an image of the missing device. Such image may be stock image obtained from the manufacturer or retail seller. In another scenario, the image may be an exact picture of what the missing device actually looks like.

In the case that the user discovers an output device nearby that matches the missing device, the user may confirm the nearby device is in fact the missing device by a user interface (UI) part on the application user interface 101*a*-4. In one example embodiment, once the user of the host terminal 101 confirms via the application user interface 101*a*-4 that the device nearby is indeed the missing device, the device tracking module 101*a*-3 sends an immediate notification to the IT administrator informing him or her that a missing device on the missing devices list has been found. In addition the immediate notification also informs the IT administrator the approximate location of the missing device and the time that the missing device was found. In another example embodiment, the application user interface 101*a*-4 may instead inform the user if he or she wants to notify the IT administrator based on specified contact information. The user of the host terminal 101 may establish accurately the exact physical location of the missing device by inputting such information into the notification notifying the IT administrator. For example, the user may say "the device is located by doorway" or "the device is in the closet" as comments to the notification.

Otherwise, operations of the elements of the system 100B are similar to those discussed in connection with corresponding elements of the system 100A of FIG. 1A.

Figure 2:
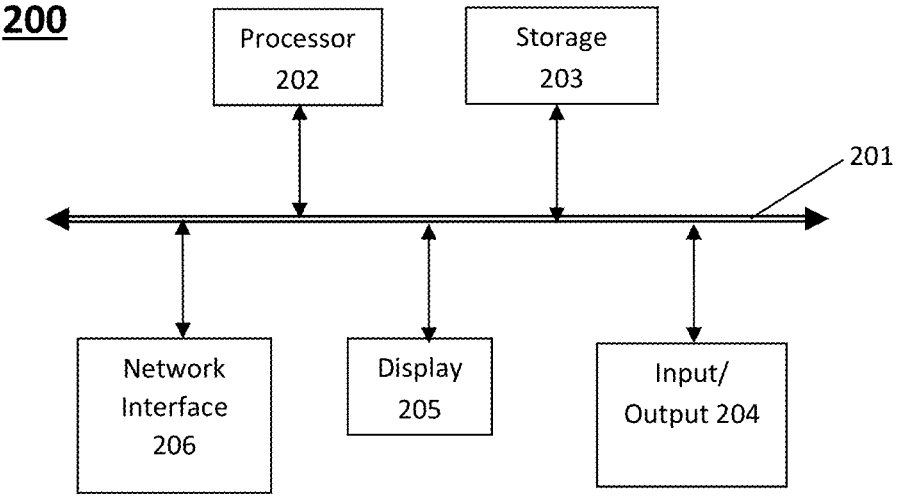
FIG. 2 shows a block diagram of an example of a configuration of a computing device that can be configured by software to operate as a device management server.

FIG. 2 shows an example constitution of a computing device that can be configured (for example, through software) to operate (at least in part) as a device management server (e.g., 103 in FIGS. 1A and 1B). In FIG. 2, apparatus 200 includes a processor (or central processing unit) 202 that communicates with a number of other components, including memory or storage device 203, other input/output (e.g., 10 keyboard, mouse, etc.) 204, display 205 and network interface 206, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the management apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 105. However, it should be appreciated that the subject matter of this disclosure is not limited to such configuration. For example, the apparatus 200 may communicate with user terminals through direct connections and/or through a network to which some components are not connected. As another example, the apparatus 200 does not need to be provided by a server that services terminals, but rather may communicate with the devices on a peer basis, or in another fashion.

The apparatus 200 of the present disclosure is not limited to a server or computer, but can be manifested in any of various devices that can be configured to communicate over a network and/or the Internet.

Figure 3:
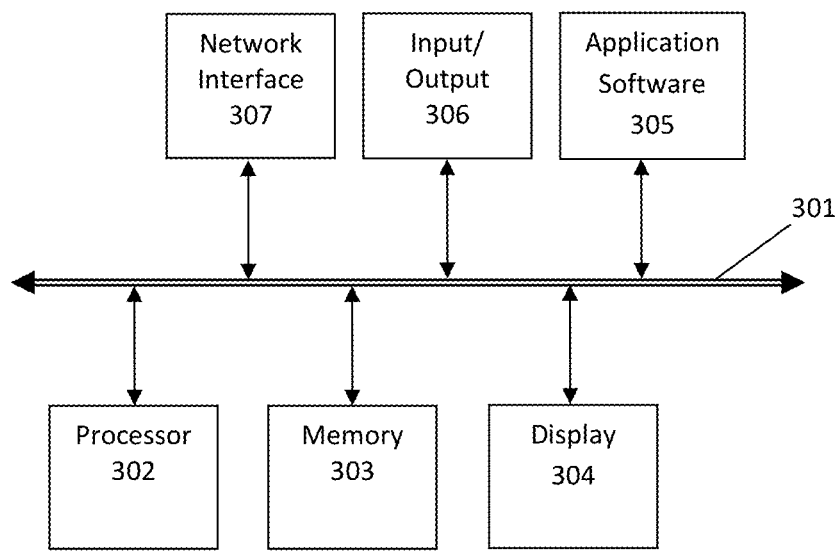
FIG. 3 shows a block diagram of an example of a typical mobile device that can be configured to be a host terminal for a mobile application that communicates with a device management server.

An example constitution of the host terminal 101 of FIGS. 1A and 1B is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 105 of FIGS. 1A and 1B).

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
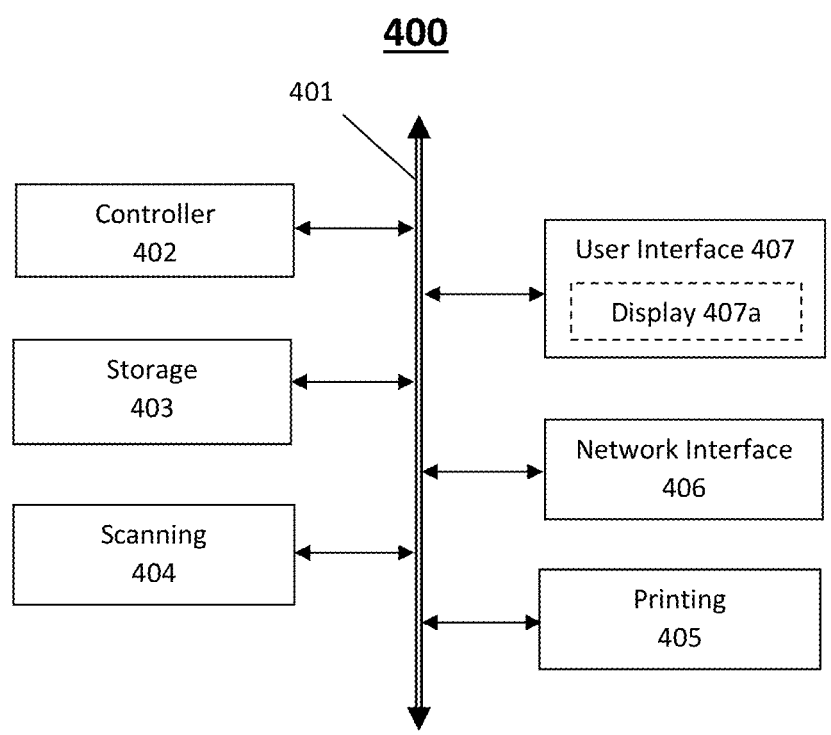
FIG. 4 shows a block diagram of an example of a configuration of a typical multi-function output device.

FIG. 4 shows a schematic diagram of a configuration of an output device as an MFP (multi-function printer or multi-function peripheral) device. The output device 400 shown in FIG. 4 includes a controller 402, and various elements connected to the controller 402 by an internal bus 401. The controller 402 controls and monitors operations of the output device 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a network interface (I/F) 406, a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the output device 400, to enable the output device 400 to interact with a terminal, as well as perhaps other external devices, through the network interface 4086, and interactions with users through the user interface 407.

The network interface 406 is utilized by the output device 400 to communicate via a network with other network-connected devices such as a terminal or a server, as well as to receive data requests, print (or other) jobs, user interfaces, and etc.

The user interface 407 includes one or more electronic visual displays that display, under control of controller 402, information allowing the user of the output device 400 to interact with the output device 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the output device 400, so as to allow the operator to interact conveniently with services provided on the output device 400, or with the output device 400 serving as terminal for accessing electronic data or other content through the network. User interfaces or other contents received through the network via the network interface 406 can be displayed on the display screen.

The display screen does not need to be integral with, or embedded in, a housing of the output device 400, but may simply be coupled to the output device 400 by either a wire or a wireless connection. The user interface 408 may include keys and/or buttons (such as graphical keys or buttons, or other graphical elements, of a GUI on a touchscreen display 407*a*) for inputting information or requesting various operations. Alternatively, the user interface 407 and the display screen may be operated by a keyboard, a mouse, a remote control, voice recognition, or eye movement tracking, or a combination thereof.

Since the output device 400 is typically shared by a number of users, and is typically stationed in a common area, the output device 400 preferably prompts the user to supply login credentials or authentication information, such as user name (or other user or group information), password, access code, etc. The user credentials may be stored for the session and automatically supplied for access to other devices through the network. On the other hand, such other devices may prompt the user to supply other user credentials through the user interface. Other methods of authentication may also be used. For example, the output device 400 may be equipped with a card reader or one or more biometrics means (such as comparing fingerprints, palm prints, voice or speech, retinas or irises, facial expressions or features, signature, etc.). The output device 400 may communicate the user credentials, provided in the manners discussed above, to other devices or applications connected to the output device 400 via a network (e.g., the network 105 of FIGS. 1A-1B) for determining authorization for performing jobs.

Scanning 404, printing 405, and network interface 406 are otherwise conventional, and therefore, a detailed description of such conventional aspects is omitted in the interest of clarity and brevity. The output device 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc.

FIG. 5 shows an example of a missing devices list that may be stored in a device management server 103, a host terminal 101 or a database accessible by the device management server 103. As shown, the missing device list includes information (e.g., name, device identifier, device model, device manufacturer, date missing, last detected location, etc.) regarding each missing device. Such information may be inputted by both the person (e.g., for last known location) who is reporting the missing device and the device management server (e.g., for date missing, etc.).

FIG. 6 shows an example of a tracked device record. As discussed previously, the tracked device record may include information (e.g., name, device identifier, device model, device manufacturer, timestamp, location, missing, etc.) regarding one or more devices that have been detected by a host terminal 101 via short-range point-to-point communication. In one example embodiment, the tracked device record includes every device (whether missing or not) that has been detected by the host terminal 101 via short-range communication. In another example embodiment, the tracked device record may only include devices (i) that have been detected by the host terminal 101 via short-range communication and (ii) that are on the missing devices list.

In the example shown in FIG. 6, the information in the tracked device record includes a timestamp which may be the exact time that the host terminal 101 detected the output device 102 via short-range communication. Such timestamp may be extracted from an internal clock or application on the host terminal 101. In addition, the information in the tracked device record also includes a location of the output device 102. In this case, the location of the output device 102 may be determined automatically by a variety of means (e.g., sensors, GPS, etc.). On the other hand, the location may also be determined by the user of the host terminal 101. Further, in one example, the information in the tracked device record may also include information on whether the output device 102 is missing or not. The host terminal 101 may detect a variety of output devices when the user of the host terminal 101 is moving in a certain location. As a result, there may be one or more output devices that are on the missing devices list and one or more output devices that are not on the missing devices list.

Figure 7A:
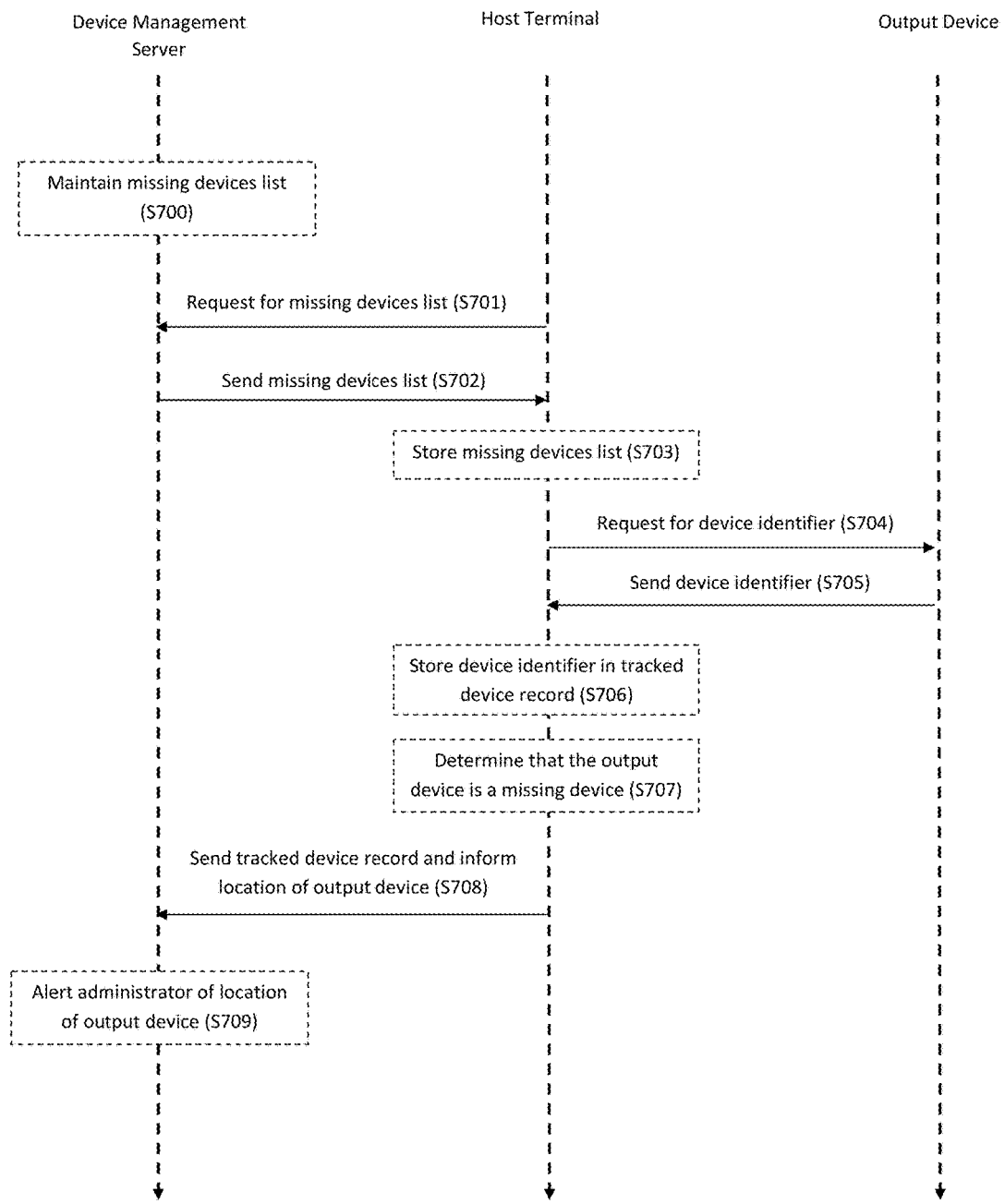
FIG. 7A shows a schematic diagram of an example of communication flow in any of the systems of FIGS. 1A and 1B (or an equivalent)

FIG. 7A shows a process that can be performed in any of the systems illustrated in FIGS. 1A and 1B (or an equivalent).

A device management server (e.g., 103) may maintain a missing devices list which includes information on one or more output devices that have been reported as missing by one or more users (step S700). When a host terminal (e.g., 101) sends a request to the device management server for the most recent version of the missing devices list (step S701), the device management server transmits, in response, the most recent version of the missing devices list (step S702). After receiving the missing devices list, the host terminal 101 may store the missing devices list in a persistent local storage of the host terminal 101 (step S703).

The user of the host terminal 101 may be moving (with the host terminal 101) around a certain location. Thus, there is a possibility that the host terminal 101 may detect, via short range point-to-point communication, an output device 102. When this event occurs, the host terminal 101 may transmit a request for a device identifier of the output device 102 (step S704). Such device identifier may be unique to each output device and may be a series of letters and numbers. In response, the output device 102 sends its device identifier to the host terminal 101 (step S705). After receiving the device identifier, the host terminal 101 stores the device identifier in a tracked device record which may be a list of all devices (and their device identifier and location) detected (or encountered) by the host terminal 101 (step S706).

Next, the host terminal 101 may compare the device identifier of the output device 102 with the device identifiers of the missing devices in the missing devices list. In this case, if there is a match, the host terminal 101 determines that the output device 102 is a missing device (step S707). Thus, the host terminal 101 indicates, in the tracked device record, that the output device 102 is found. Next, the host terminal 101 sends the updated tracked device record to the device management server informing the location of the output device 102 (step S708). After receiving the updated tracked device record and location of the output device 102, the device management server sends out a notification to notify an IT administrator that the output device 102 has been found (step S709).

Figure 7B:
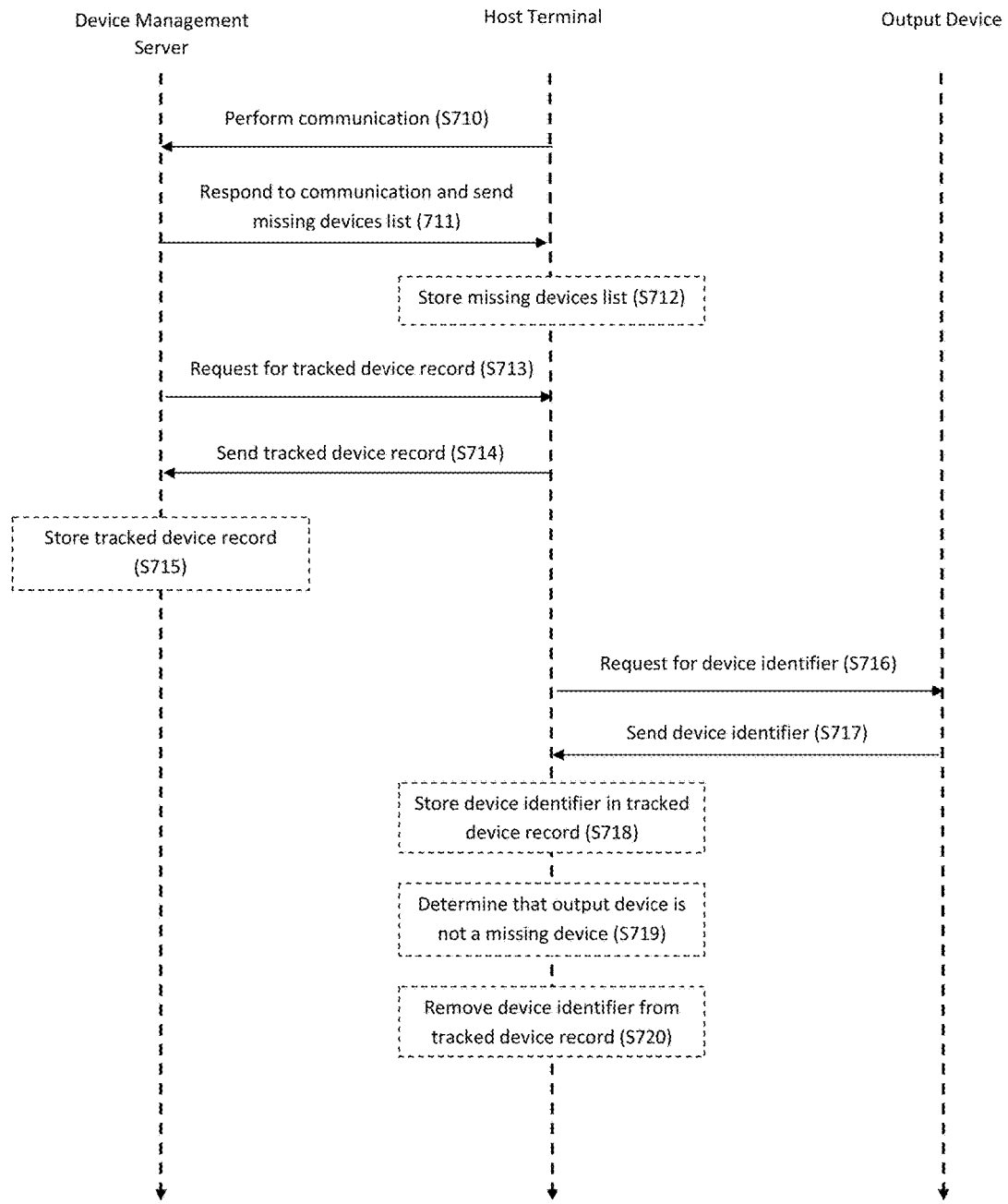
FIG. 7B shows a schematic diagram of an example of communication flow in any of the systems of FIGS. 1A and 1B (or an equivalent)

FIG. 7B shows a process that can be performed in any of the systems illustrated in FIGS. 1A and 1B (or an equivalent).

The device management server (e.g., 103) and the host terminal (e.g., 101) may perform a variety of communications with each other (step S710). For example, the host terminal 101 may communicate with the device management server to notify the device management server 103 that the host terminal 101 is now part of the system. Whenever a communication occurs from the host terminal 101, the device management server may (i) respond to the communication and (ii) send a missing devices list to the host terminal 101 (step S711). In response to receiving the missing devices list, the host terminal 101 stores the missing devices list in a persistent local storage of the host terminal 101 (step S712). Next, the device management server takes the opportunity (since it is already in communication with the host terminal 101) to request from the host terminal 101 a tracked device record (if any) stored in the host terminal 101 (step S713). In this case, the host terminal 101 does have a tracked device record stored and, therefore, in response sends the tracked device record to the device management server (step S714). After receiving the tracked device record, the device management server stores it in, for example, a storage 203 (step S715).

The user of the host terminal 101 may be moving (with the host terminal 101) around a certain location. Thus, there is a possibility that the host terminal 101 may detect, via short-range point-to-point communication, an output device 102. When this event occurs, the host terminal 101 may transmit a request for a device identifier of the output device 102 (step S716). Such device identifier may be unique to each output device and may be a series of letters and numbers. In response, the output device 102 sends its device identifier to the host terminal 101 (step S717). After receiving the device identifier, the host terminal 101 stores the device identifier in a tracked device record which may be a list of all devices (and their device identifier and location) detected (or encountered) by the host terminal (step S718). Next, the host terminal 101 may compare the device identifier of the output device 102 with the device identifiers of the missing devices in the missing devices list. In this case, if there is no match, the host terminal 101 determines that the output device 102 is not a missing device (step S719). Thus, the host terminal 101 removes, from the tracked device record, the device identifier of the output device 102 (step S720).

Figure 8:
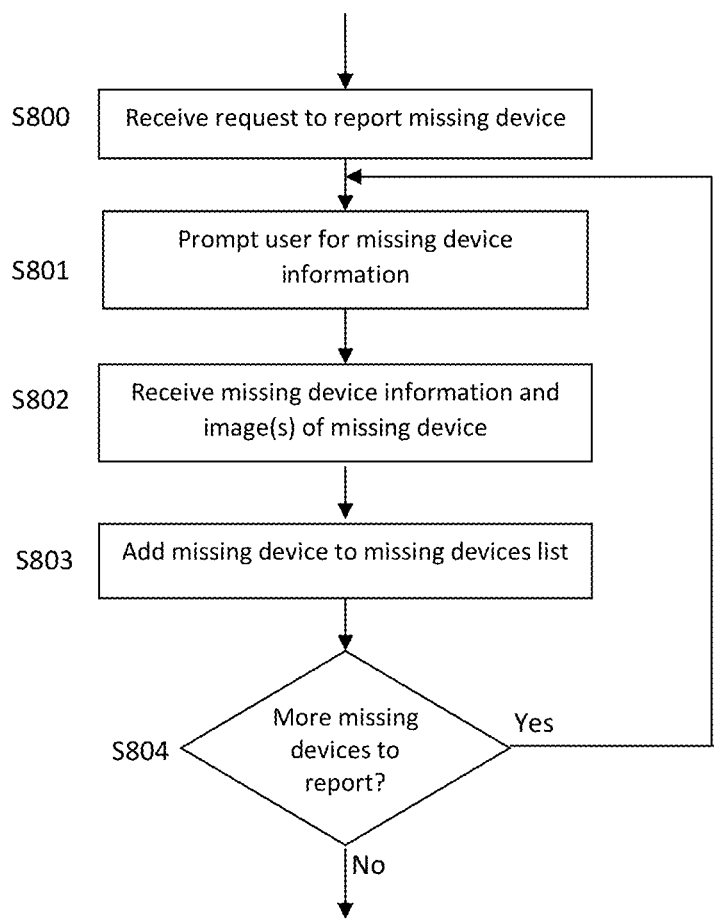
FIG. 8 shows a flow chart of a method that can be performed in any of the systems of FIGS. 1A and 1B (or an equivalent)

FIG. 8 shows a method that can be performed by or with a mobile application (e.g., 101*a*) on a host terminal (e.g., 101), according to an example embodiment.

In this example scenario, a user ("Jimmy Hart") may be an administrator working at a company ("Baryon, Inc.") that possesses a large building which contains many offices, each of which includes a plurality of devices (e.g., printers, MFPs, facsimiles, scanners, personal computers, laptops, tablets, notebook computers, etc.) that are connected to a network (e.g., network 105 in FIGS. 1A and 1B) via, for example, switches. However, there may be a problem in that, since the building is extremely large (i.e. hundreds of offices), it would be difficult for an administrator to monitor every device (and their corresponding movements) in the company.

For example, devices in the company may be moved around or added/removed from the network. Such movement or addition/removal may be performed independently by users, other personnel, etc., without notifying administrators or an information technology (IT) department. Consequently, when devices go missing or change locations, an administrator has difficulty in locating such devices. Further, in another example, employees leave the company for a variety of reasons (e.g., new job, going back to school, retirement, etc.). As a result, their offices may be left empty until new employees are hired to replace them. In this time interval of between leaving and hiring, existing employees may attempt to take, without authorization, devices that were left in the now empty offices. Like previously, the administrator also has difficulty in locating these missing devices.

Figure 9:
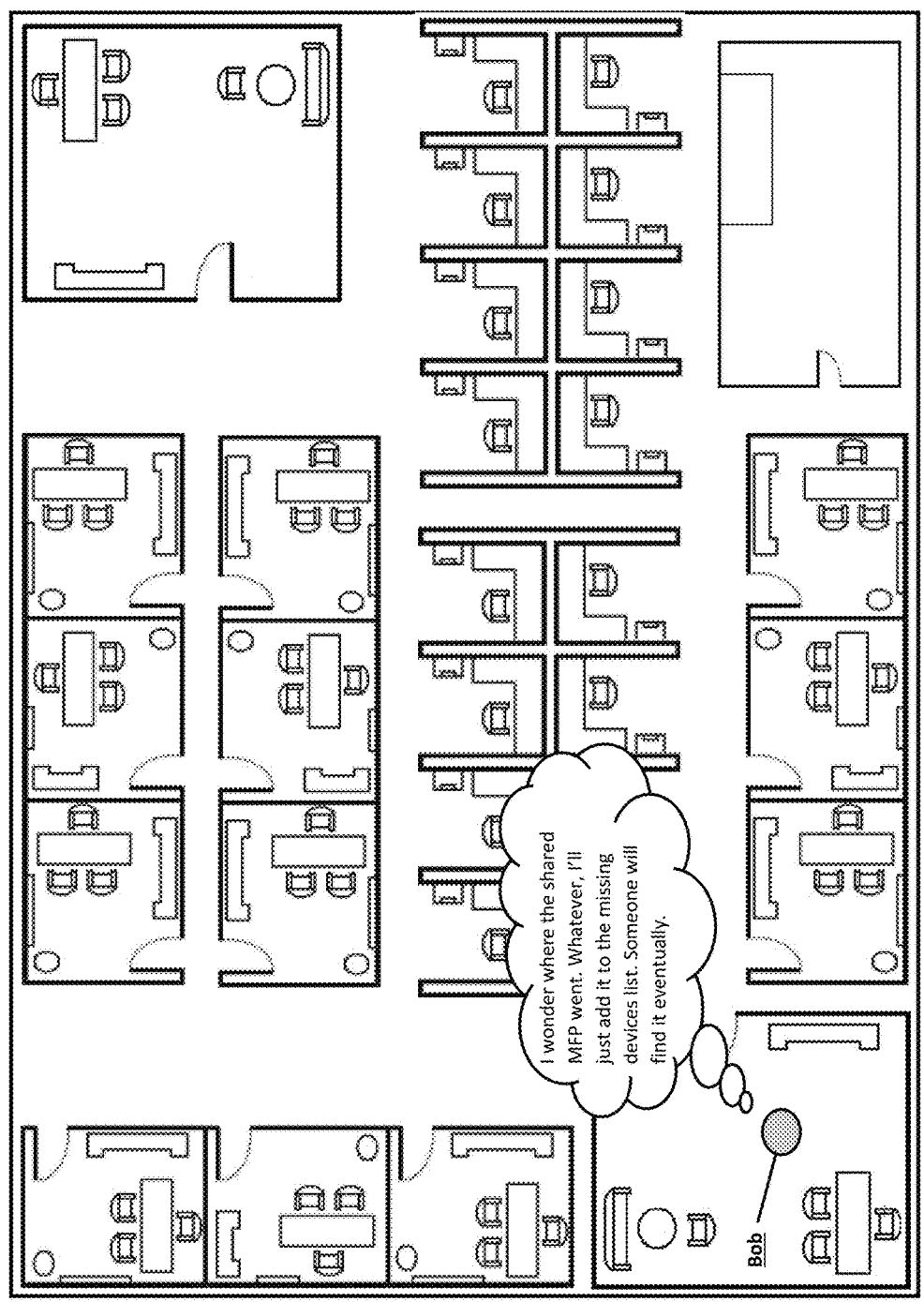
FIG. 9 shows notionally an example of interaction between a host terminal and an output device, in any of the systems of FIGS. 1A and 1B (or an equivalent)
Figure 10A:
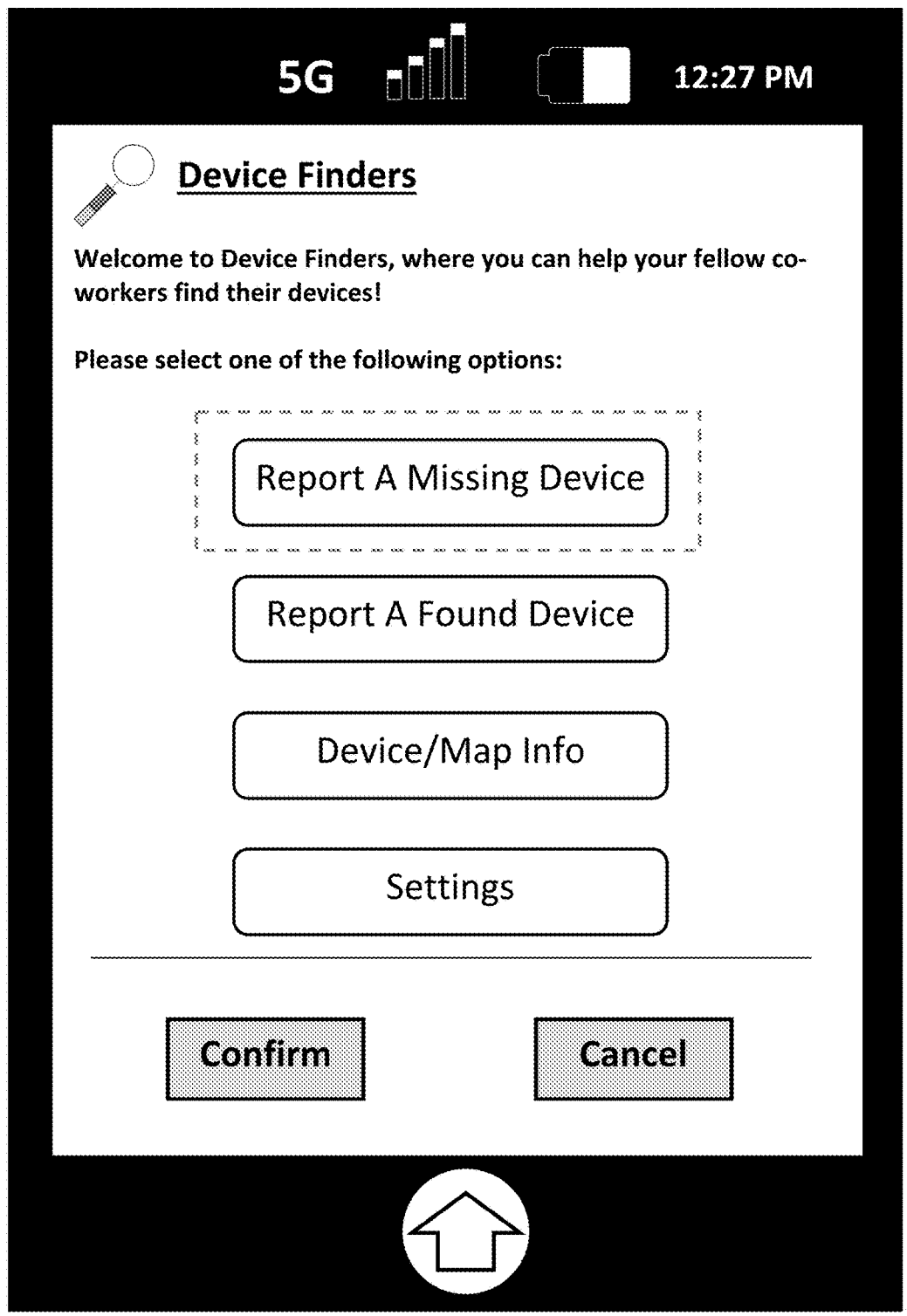
FIGS. 10A-10D show examples of user interface screens that can be provided by a mobile application, in any of the systems of FIGS. 1A and 1B (or an equivalent)
Figure 10B:
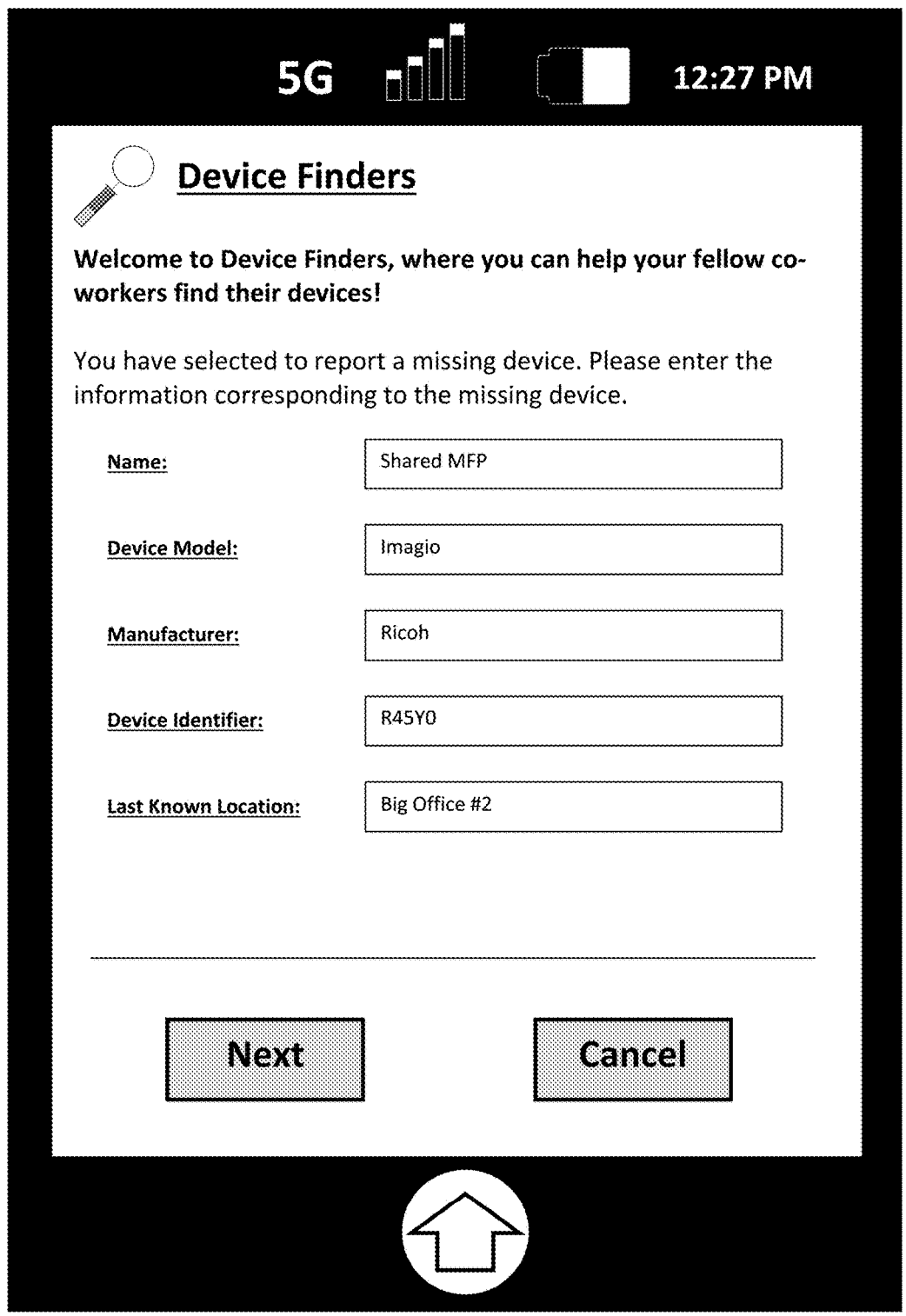

In this case, the office includes not only output devices that are utilized by only one user but also output devices that are shared amongst multiple users. In one example, such shared output devices may be shared between multiple users since the shared output devices (i) are few in number, (ii) are expensive, (iii) include advanced features. For example, the shared output device may include features for printing In an example scenario, a user (e.g., Bob) may currently have one of the shared output devices in his office. However, while the user goes out of his office to get coffee in the pantry, one of the users takes the output device 102. When the user returns to his office, he discovers that the output device 102 is missing, such as shown notionally in FIG. 9. The user utilizes a mobile application (e.g., 101*a*) to report a missing device, such as by activating the "Report A Missing Device" button shown in FIG. 10A. After the mobile application receives a request from the user to report a missing device (step S800), the mobile application prompts the user for information regarding the missing device (step S801), such as illustrated in FIG. 10B. As shown, the mobile application may ask for one or more information items (e.g., device model, manufacturer, device name, device identifier, last known location, etc.) corresponding to the missing output device 102 (step S801). Such information may assist the mobile device or others (e.g., users, IT administrator, etc.) in recovering the missing output device 102.

In an example, the user is not required to input all information items (i.e. category) requested by the mobile application. The user may input whatever information that is available to him at the time. For example, the user may only need to input the device identifier of the output device 102 that he is looking for. In another example the user may only need to put in the name of the output device 102 (assuming that the name of every output device there is unique). Of course, in another example, if the user inputs only the device manufacturer, this may not be acceptable by the mobile application since it may not be enough information to find the missing output device 102.

Figure 10C:
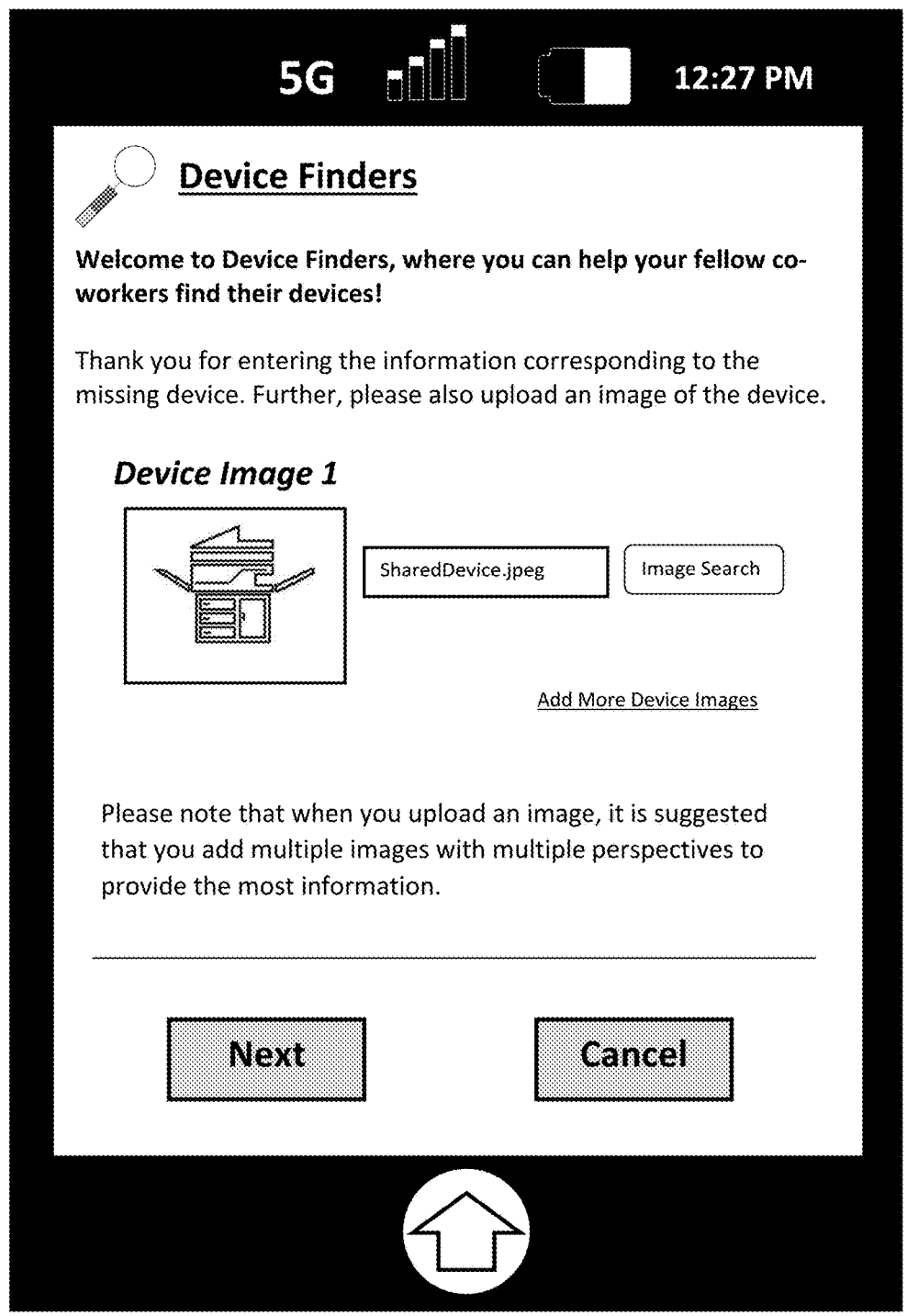

In addition, the mobile application may also prompt the user to upload one or more images of the missing output device 102, such as shown in FIG. 10C. For example, such image may directly correspond to the missing output device 102 (e.g., photograph taken by an IT administrator or user). In another example, the image may be a stock image (i.e. retail photo) of the missing output device 102. Further, the user may also be permitted to upload multiple images of the missing output device 102 (e.g., multiple perspectives of the missing output device). It should be noted that the uploaded images of the missing output device 102 may assist users who discover (i.e. find) the missing output device 102 in verifying whether the output device 102 discovered by the users match the missing output device 102 by way of comparison.

Figure 10D:
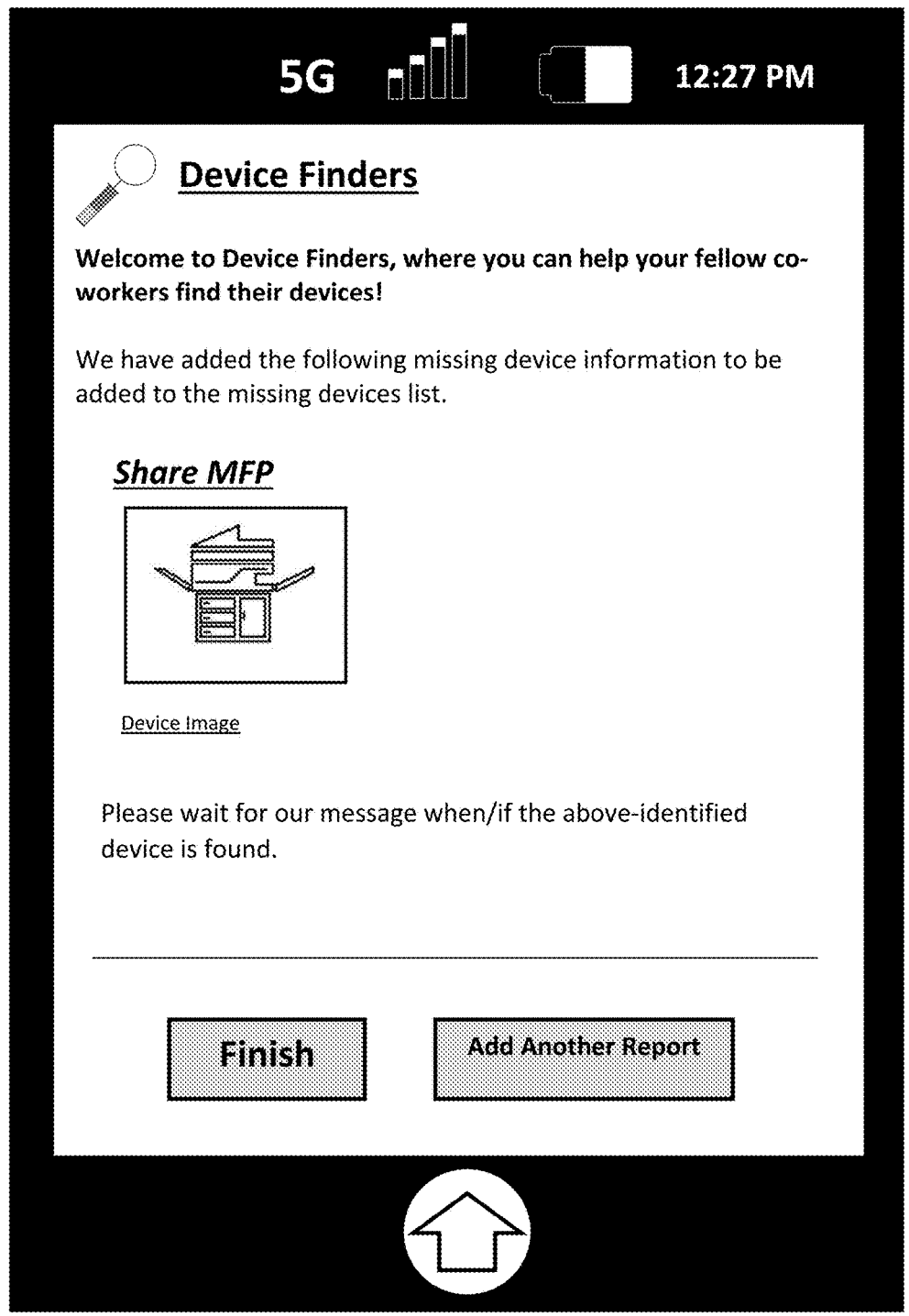

After receiving the necessary information (step S802), the mobile application may add the output device that the user is trying to find to the missing devices list (step S803), such as shown in FIG. 10D. The user may also be given the option to add more missing devices to the missing devices list by way of the "Add Another Report" button. In the case that the user wishes to add more devices (step S804, yes), the process repeats. Otherwise (step S804, no), the process ends. In an example, such missing devices list may include a list of output devices that have been reported as missing. It should be noted however, that the output devices on the missing devices list are not limited to output devices that are shared by users. Any output device that is missing can be reported on the missing devices list.

Figure 11:
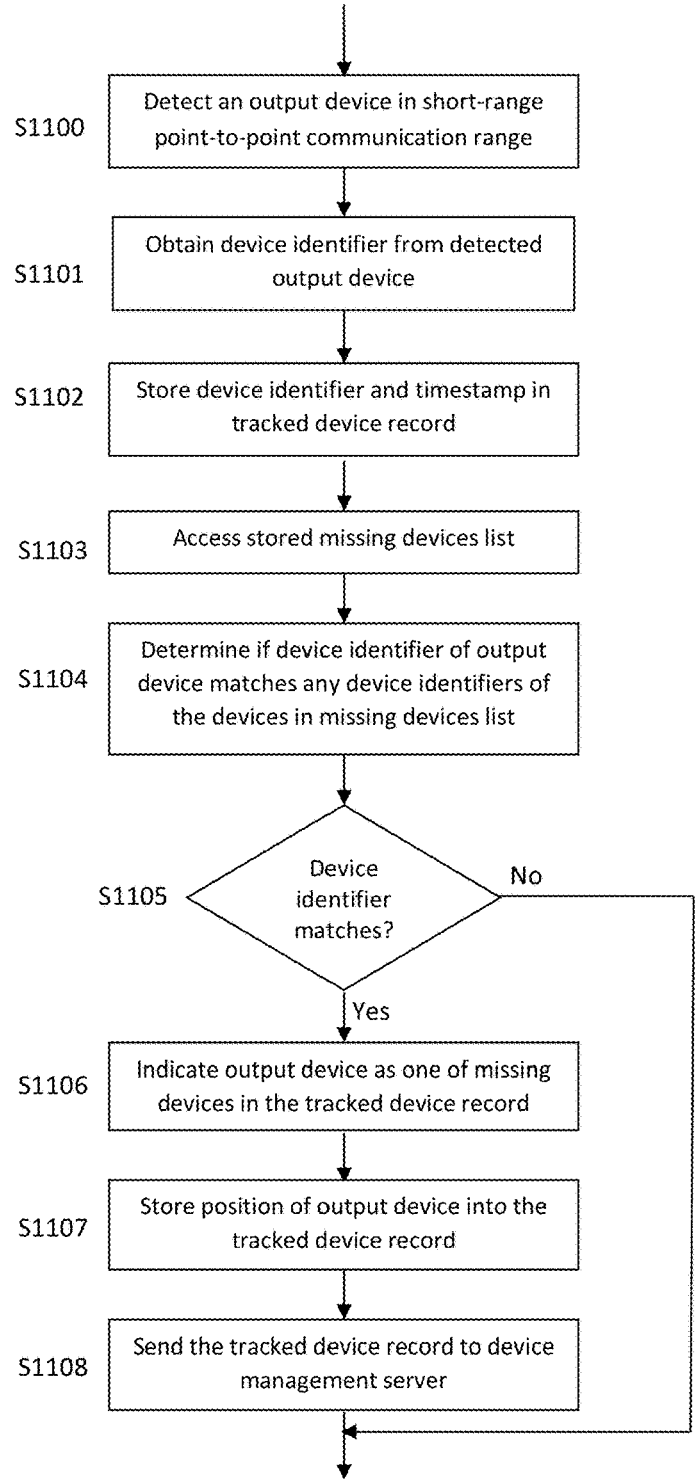
FIG. 11 shows a flow chart of a method that can be performed in any of the systems of FIGS. 1A and 1B (or an equivalent)

FIG. 11 shows a method that can be performed by or with a mobile application (e.g., 101a) on a host terminal (e.g., 101), according to an example embodiment.

The system (e.g., system 100A shown in FIG. 1A and system 100B in FIG. 1B) that can be utilized for facilitating the reporting and finding of output devices may include host terminals and output devices that may be able to communicate in both a wireless communication range and a short-range point-to-point communication range.

For example, a host terminal 101 is carried by the user in his hand or in his pocket, such as shown notionally in FIG. 12A. The host terminal 101 may include a network interface that allows the host terminal to communicate wirelessly with other devices (e.g., printer, MFP, tablet, smartphone, etc.) via various network protocols (e.g., 802.11, Bluetooth). Such normal wireless communication may happen when a normal wireless communication range of the host terminal 101 overlaps with a normal wireless communication range of another device (e.g., host terminal, output device, etc.). The host terminal 101 can register presence of, and communicate with, an output device 102 when the mobile apparatus is within the operating range of the output device 102.

On the other hand, the host terminal 101 may also perform short-range point-to-point range communication with another device as well. Like normal wireless communication, the short-range point-to-point communication can be performed wirelessly. However, the short-range point-to-point communication range is smaller than the normal wireless communication range. In other words, in order for the mobile device to perform communication with another device using a protocol associated with short-range point-to-point communication, the host terminal 101 and the other device may need to be physically in a closer proximity than when normal wireless communication is used. Thus, even if the other device is within the normal wireless communication range of the host terminal 101, the host terminal does not communicate with the other device, and instead waits for the other device to be in the short-range communication range of the host terminal or vice versa.

Figure 12C:
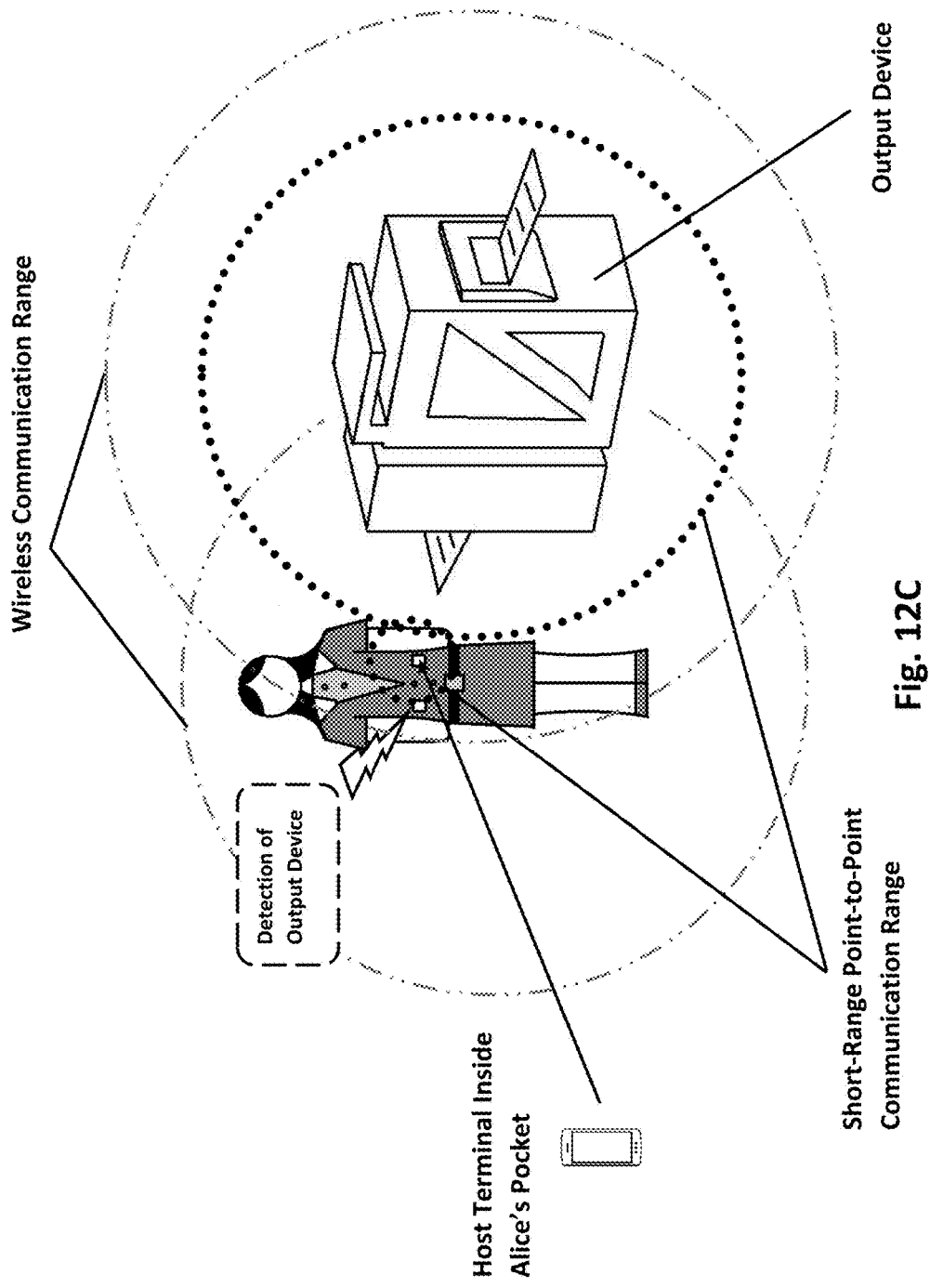

For example, the host terminal 101 of another user (e.g., Alice) may be in a normal wireless communication range of an output device 102, such as shown notionally in FIG. 12B. However, even though the output device 102 is within the normal wireless communication range of the host terminal 101, the host terminal 101 does not detect the output device 102 as the output device 102 is not within the short-range point-to-point communication range of the host terminal 101. When the user moves closer to the output device 102 to a point in which the guest print hotspot device A is within the short-range point-to-point communication range of the mobile device, the mobile device then detects the output device 102, such as shown notionally in FIG. 12C. It should be noted that the detection is performed automatically meaning that the host terminal 101 be anywhere in, for example, the user's pocket, hands, etc., and does not require manual operation by the user. After the host terminal 101 has detected the output device 102, each device may perform communications with each other (e.g., device recognition). In one example embodiment, the short-range point-to-point communication range may be Bluetooth ranges which allows automatic pairing when the detection regions overlap.

Figure 12D:
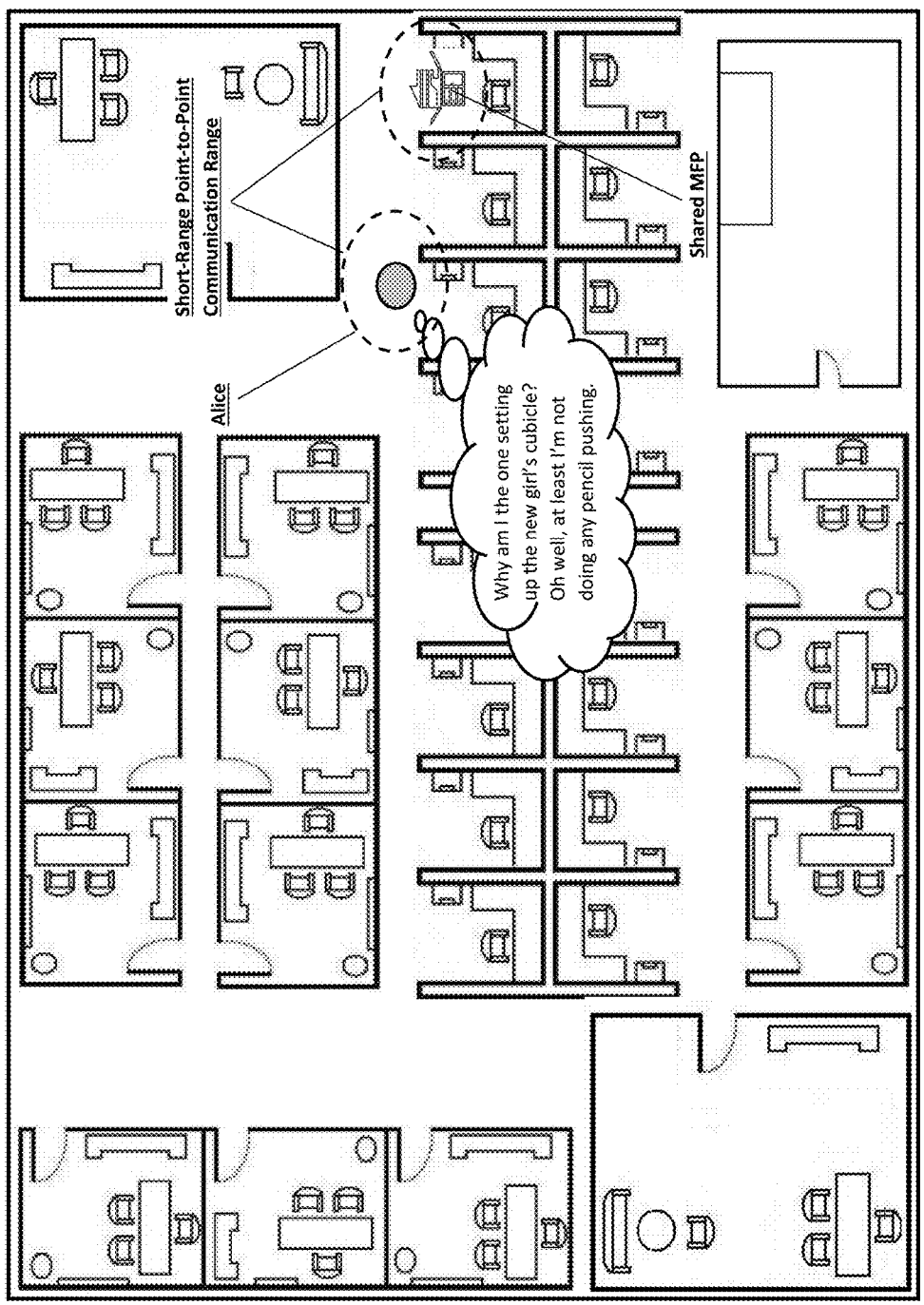
Figure 12E:
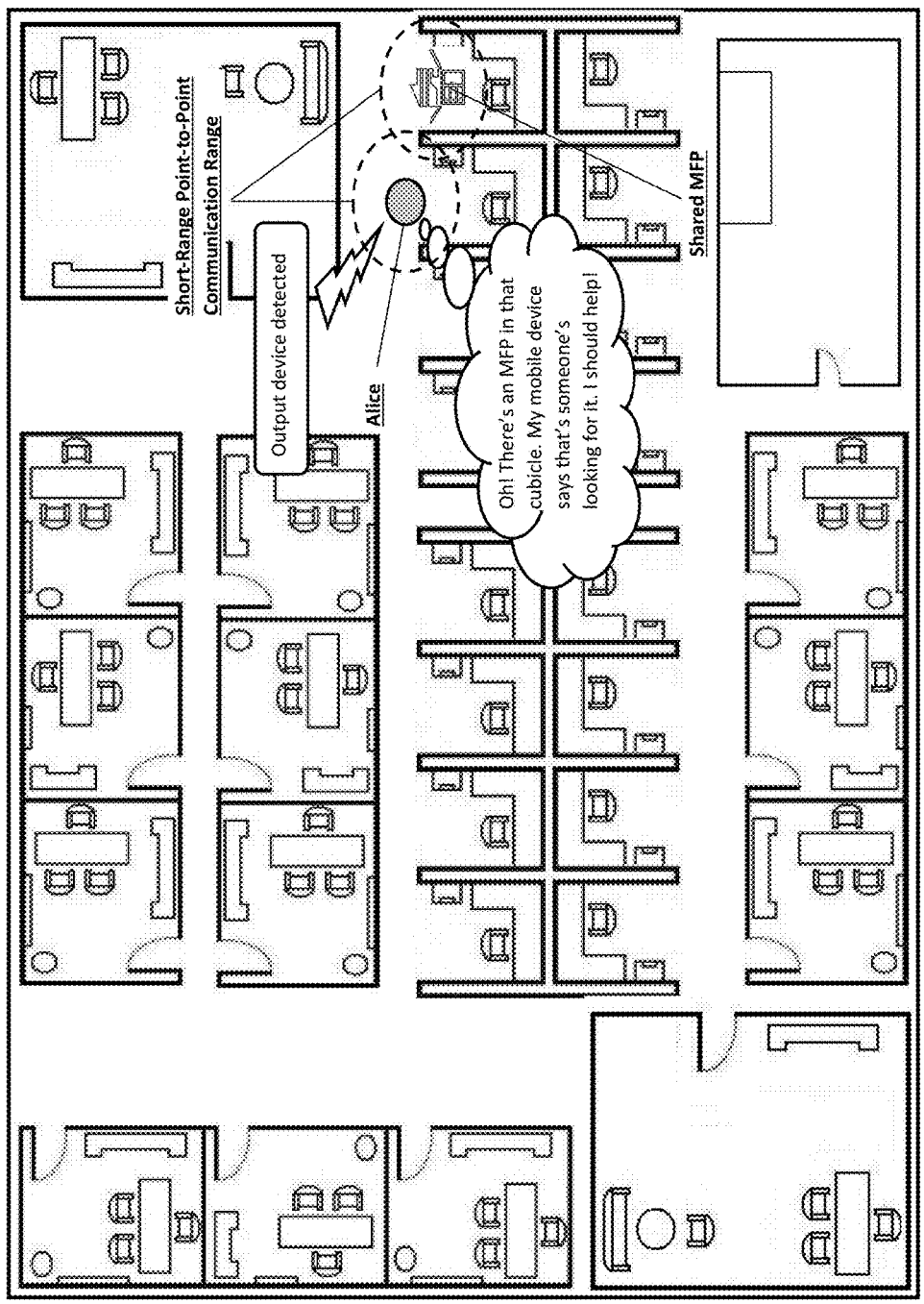

Thus, after the user has sent out his request for the shared output device 102 to be found, other users may be notified of the missing shared output device 102 after one or more of the users encounter (i.e. discover) the missing output device 102. One such user may be Alice who is currently setting up a cubicle for a new incoming employee (e.g., Sammy), such as shown notionally in FIG. 12D. As the user walks towards the cubicle, her host terminal 101 detects that there is an output device 102 nearby, since the short-range point-to-point communication range of the host terminal 101 overlaps with the short-range point-to-point communication range of the output device (step S1100), such as shown notionally in FIG. 12E. Next, the mobile application is informed via the host terminal 101 that the host terminal 101 has detected an output device 102. Thus, the mobile application obtains a device identifier of the detected output device 102 (step S1101).

Then, the mobile application may obtain a timestamp of when the output device 102 has been detected. Such timestamp may be extracted from an internal clock on the host terminal 101 or a clock application installed on the host terminal 101. Afterwards, the mobile application stores the obtained device identifier and the timestamp in a tracked device record (step S1102). The tracked device record may be a record (or list) of one or more devices that the user's host terminal 101 detected via short-range communication. Next, the mobile application accesses a missing devices list that is stored on the host terminal 101 (step S1103). Such missing devices list may include one or more output devices that have been reported as missing. Further, the mobile application may download the missing devices list from a device management server (e.g., 103) or may have such missing devices list being pushed to the mobile application at regular intervals of time.

After accessing the missing devices list, the mobile application determines whether the obtained device identifier from the detected output device corresponds to any device identifiers in the missing devices list (step S1104). In the case that there is a device identifier on the missing devices list that matches the obtained device identifier from the detected output device (step S1105, yes), the mobile application indicates in the tracked device record that the detected output device is one of the missing devices in the missing devices list. Such indication may be performed by marking or designating the detected output device in the tracked device record as a missing device (step S1106).

Figure 13A:
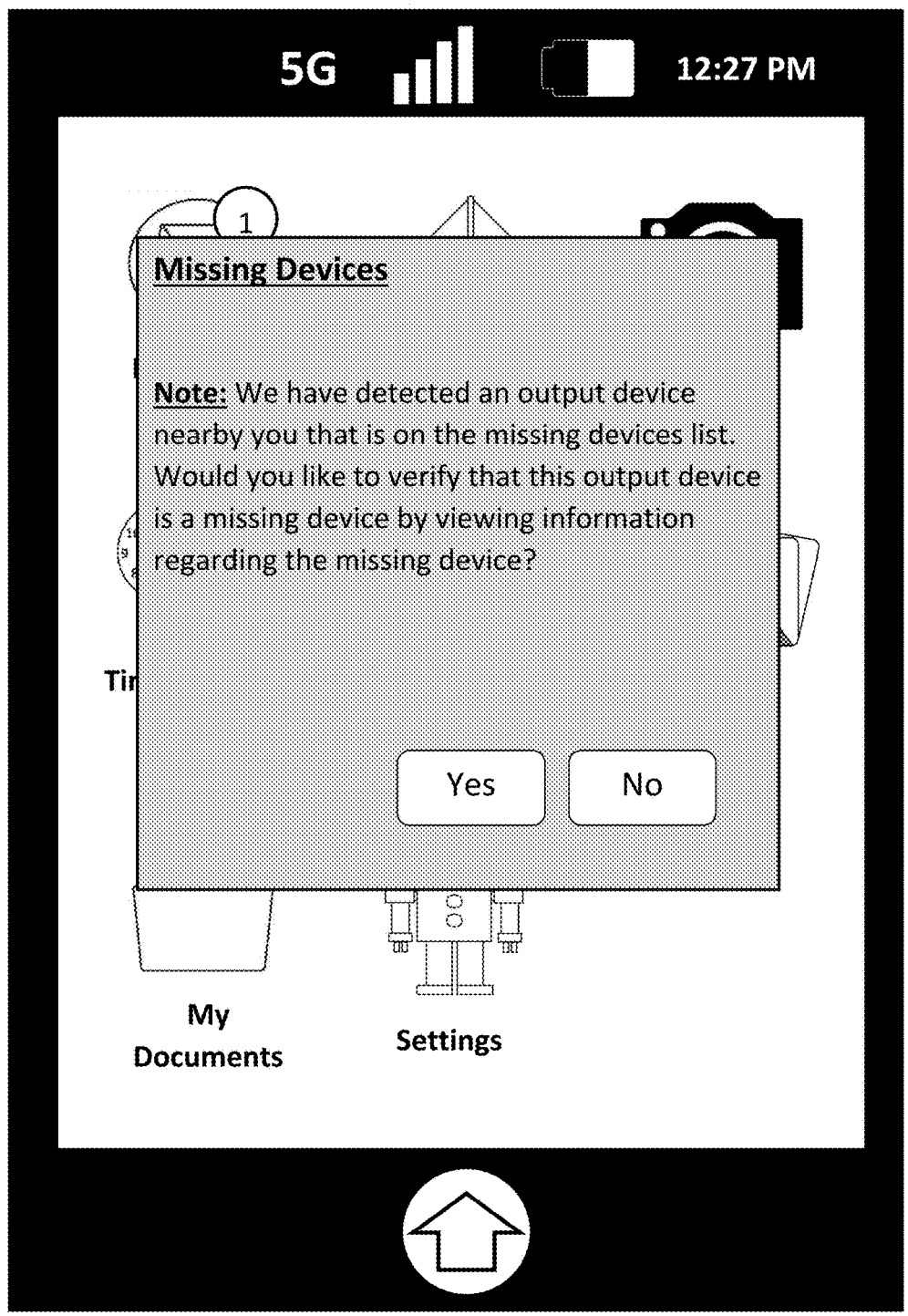
FIGS. 13A-13D show examples of user interface screens that can be provided by a mobile application, in any of the systems of FIGS. 1A and 1B (or an equivalent)

After determining that the detected output device 102 is indeed a device that is missing, the mobile application on the user's host terminal 101 alerts and informs her (i) that there is an output device 102 nearby the position of the user and (ii) that is on the missing devices list, such as shown in FIG. 13A. Since the user is aware that an output device 102 is near her position, she looks around and discovers that there is an output device 102 that is in a cubicle adjacent to the cubicle that the user is setting up.

Figure 13B:
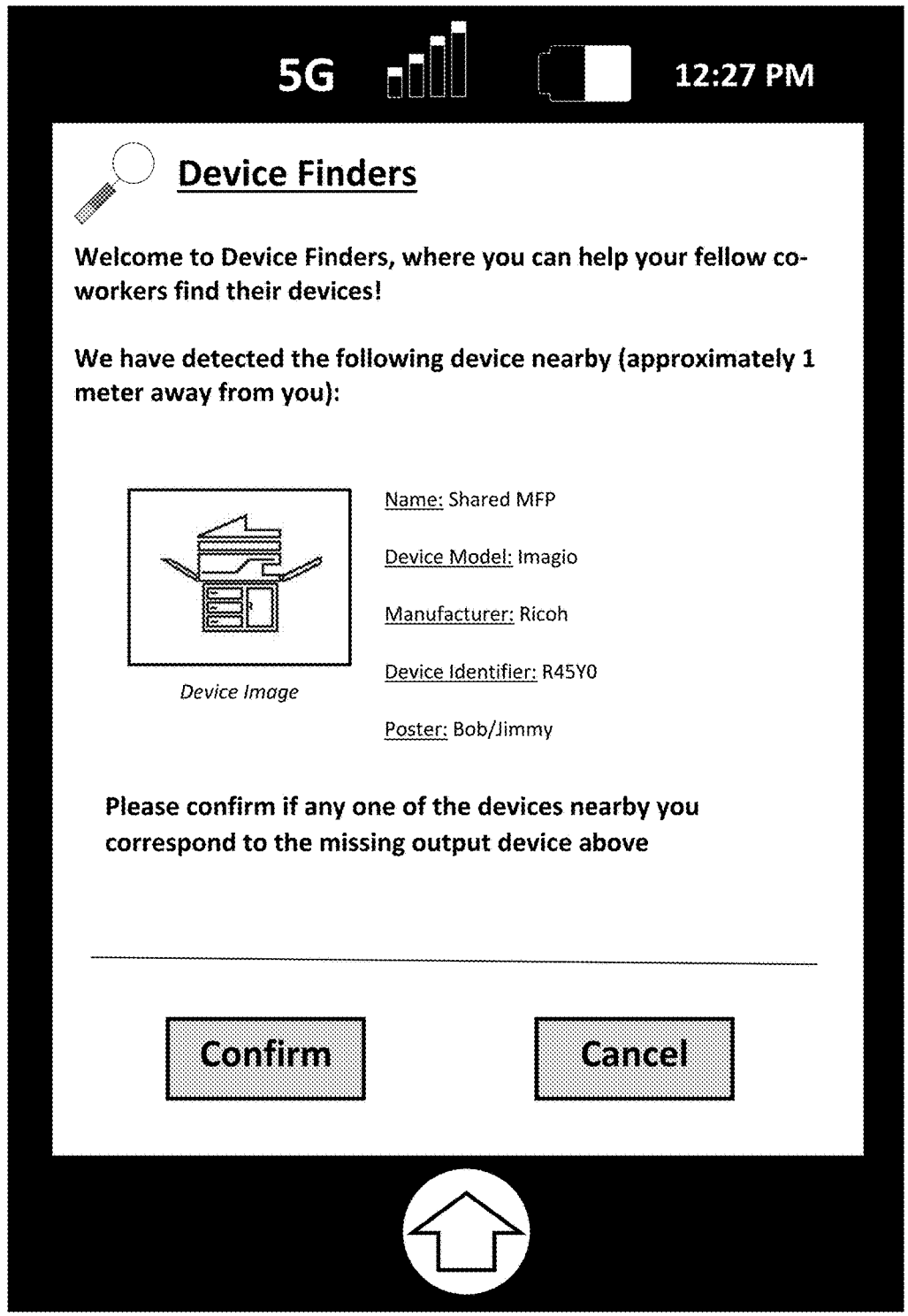

However, the user is not sure whether the output device that she has discovered is, in fact, a missing device. The output device discovered by the user may belong to an occupier of that particular cubicle. In another scenario, there may be many output devices surrounding the user. Thus, she may not know which output device is the missing one. To find out more information regarding the output device, the user may activate the "Yes" button on the screen shown in FIG. 13A. This causes the mobile application to present information (e.g., device name, device manufacturer, device identifier, poster, etc.) to be presented to her, such as shown in FIG. 13B. It should be noted that the poster information represents the person who initiated this request (e.g., Bob) or whose interest corresponds to this request (i.e. IT administrator Jimmy). In addition, the image of the missing device is also shown to the user.

By utilizing the information presented to the user by the mobile application, the user determines that the output device 102 that she has discovered is indeed the same output device 102 as the missing device that was shown to her in the screen illustrated in FIG. 13B, by activating the "Confirm" button. Next, the mobile application automatically determines the location of the output device 102. In one example embodiment, the mobile application determines the location of the output device 102 based on where the user is standing. In other words, it is likely that for the user to determine whether the detected output device 102 is indeed the missing output device 102, she must be standing very close to the detected output device 102 to perform a visual inspection. Thus, by determining the location of the user, the mobile application may also obtain a very accurate position of the detected output device 102. In another example embodiment, the mobile application may determine the user's location based on a global positioning system (GPS). In yet another example embodiment, the mobile application may determine the location of the user via one or more sensors that are disposed throughout the office. Such sensors may accurately detect the position of the user via her host terminal 101. In addition, the sensors may detect the output device 102 as well.

Figure 13C:
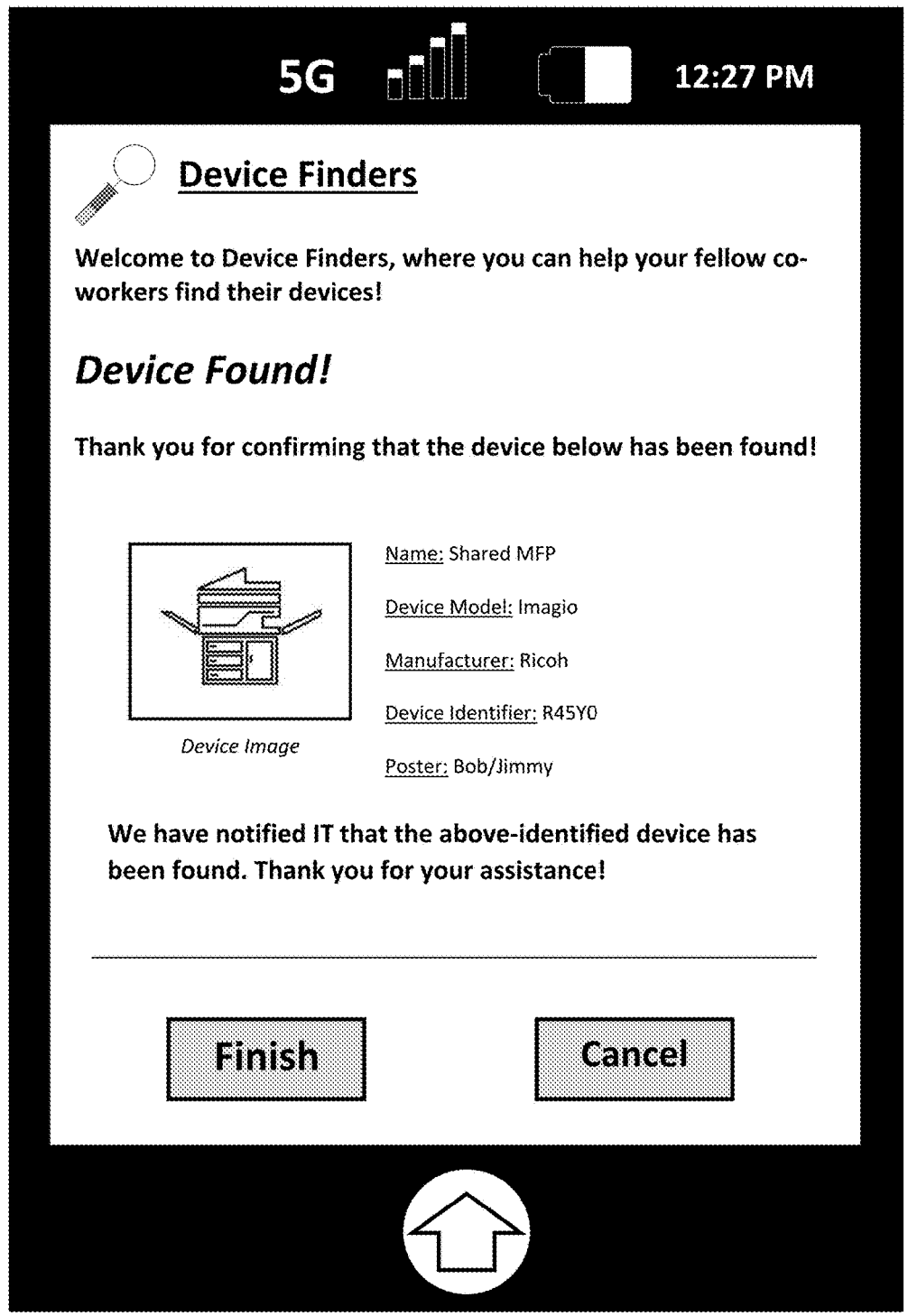
Figure 13D:
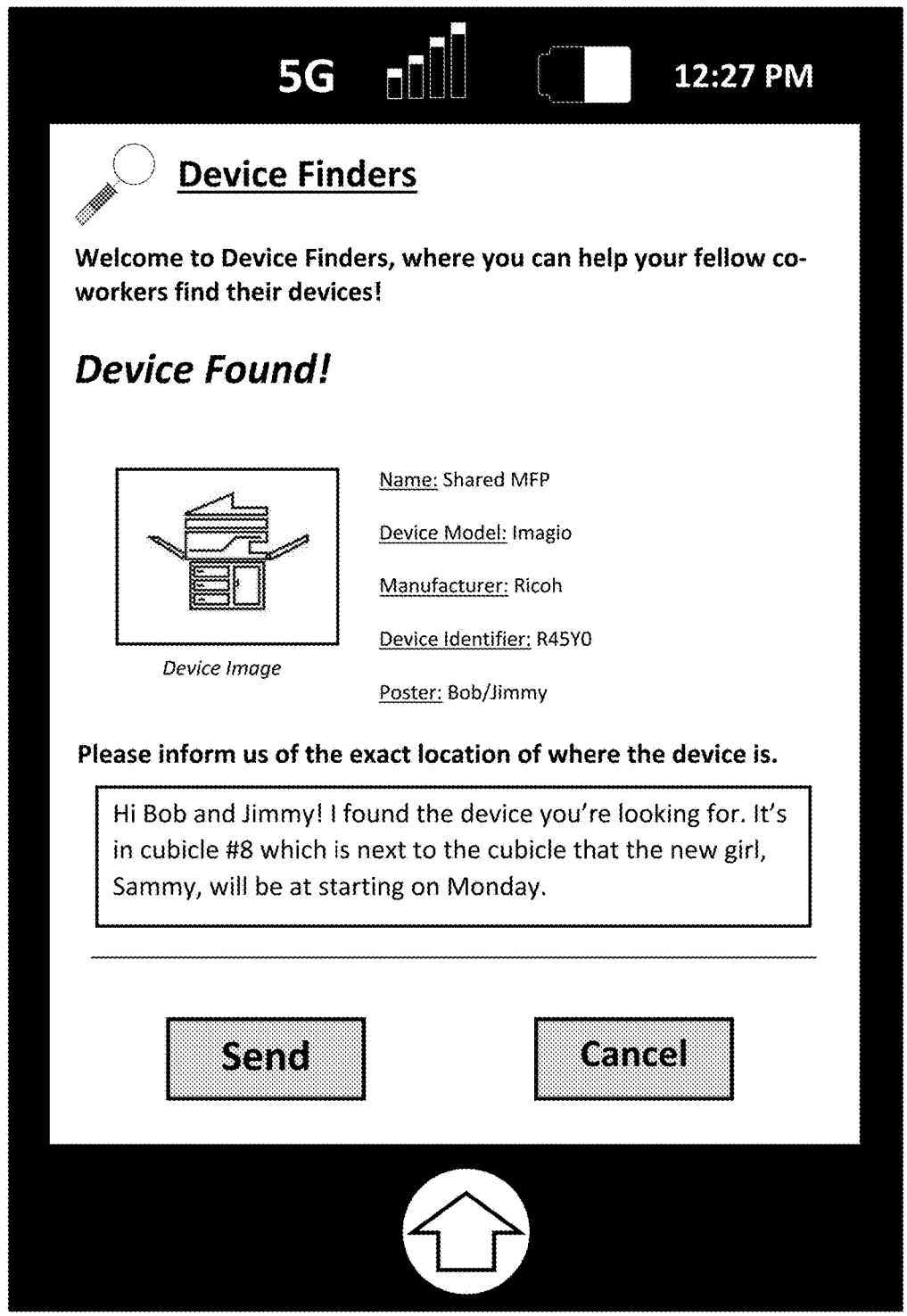

After determining the location of the output device 102, the mobile application stores the position of the output device 102 onto the tracked device record (step S1107). Next, the mobile application notifies the IT department that the missing output device 102 has been found (step S1108), such as shown in FIG. 13C. In an example embodiment, the use Alice may also add notes (or comments) regarding the location of the missing output device 102, such as shown in FIG. 13D. There is a possibility that there is no system implemented there that allows the automatic determination of the location of the user, her host terminal 101 or the output device 102. Thus, the user is given the opportunity to accurately tell the IT administrator or the poster of the missing output device 102 where the missing output device 102 is. For example, the user provides (e.g., in the UI screen shown in FIG. 13D) comments regarding the position of the output device 102 with references to objects, events and/or locations near the output device 102.

Figure 14:
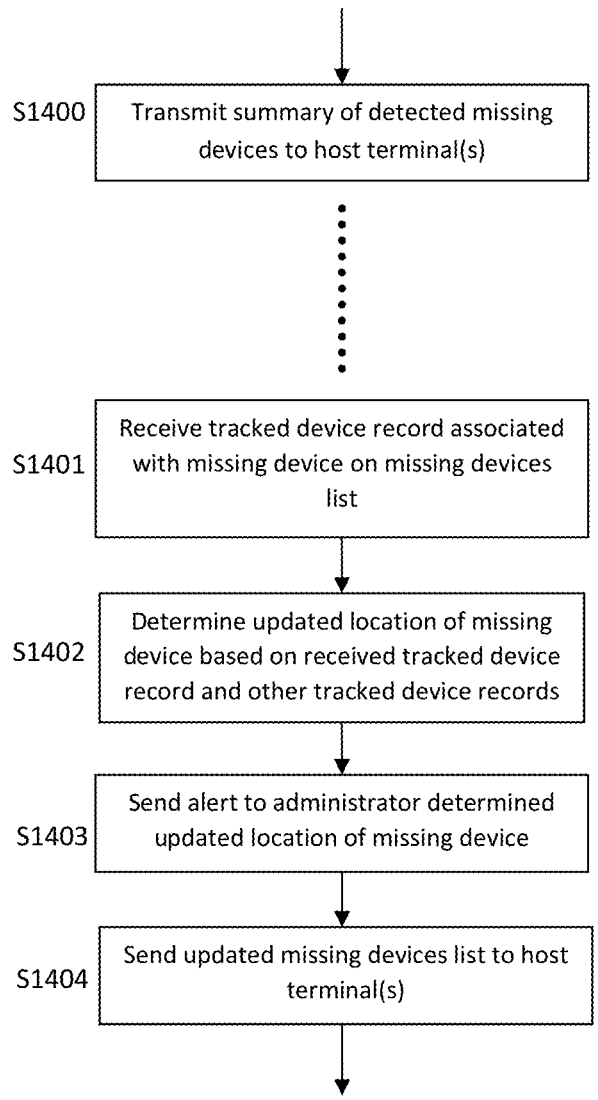
FIG. 14 shows a flow chart of a method that can be performed in any of the systems of FIGS. 1A and 1B (or an equivalent).

FIG. 14 shows a method that can be performed by or with a device management server (e.g., 103), according to an example embodiment.

The device management server may receive one or more tracked device records from one or more host terminals. Such tracked device records may include information regarding (i) the devices that the corresponding host terminal has detected via short-range point-to-point communication range, (ii) missing devices that have been detected and (iii) locations that have been associated with the missing devices. In addition, the device management server may, at various moments in time, receive requests from users to add a device that is missing to the missing devices list. Consequently, the missing devices list may be repeatedly changing (or updated) while the missing devices list stored on a host terminal (e.g., 101) may be outdated or may not include the most recent missing devices. Likewise, due to the constant movement of the host terminal and discovery of detected devices, the tracked device records may also be continually changing.

Thus, device management server (i) may compile the most recent version of the missing devices list and the most recent versions (for each host terminal) of the received tracked device records into a summary of detected missing devices and (ii) may automatically send out, at a constant interval (or a regular notification schedule set by an IT administrator), the summary of detected missing devices that include the most recent information stored to each host terminal that is permitted to receive the summary (step S1400). In one example embodiment, the device management server may not only automatically send out the summary of detected missing devices at regular intervals, but may also send out the summary in response to request from one or more host terminals.

As stated previously, the device management server may be (i) receiving requests to add a missing device to the missing devices list, (ii) receiving a tracked device record from one or more host terminals and/or (iii) sending out the summary of detected missing devices. However, when the device management server receives the tracked device record from a host terminal, it may be possible that the device management server has not yet received any other tracked device record from any other host terminals. Thus, to save space, the device management server may not need to compile data from the other tracked device records received from other host terminals.

Thus, in such a case, when the device management server receives a tracked device record associated with missing device on missing devices list (step S1401), the device management server determines an updated location of missing device based on received tracked device record and other tracked device records previously received from other host terminals (step S1402). Next, the device management server sends an alert to administrator determined updated location of missing device (step S1403). Afterwards, the device management server sends the updated missing devices list to one or more host terminals (step S1404). Thus, it is not necessary to always send the summary of detected missing devices. It may be more efficient and space saving to send only an updated missing devices list.

An example including many of the aspects discussed supra will now be discussed. In such example, the device management system is configured to allow an end user, IT staff member, helpdesk staff member or an administrator to mark a device as missing, using or the aforementioned mobile application or a web page provided by the device management system.

When an unauthorized person moves an output device to a new location, typically the organization's IT staff are not notified, so the device is not immediately noted as missing. However, at some point in time after the move, either an IT staff member or an end user will notice that the device is no longer in its expected location. At this time, one of the following may happen:

- the end user notices that the device has been moved, and marks it as missing using the mobile application (or on an end user web page provided by the device management system);
- the end user notices that the device has been moved, and opens a helpdesk ticket to resolve the issue, and the helpdesk staff then marks the device as missing;
- an IT staff member notices that the device has been moved, and marks it as missing using the device management application;
- the end user (or IT staff member) ignores the problem, and in this case, detection of the problem will be delayed until the next time.

The device management system maintains a list of devices marked as missing, including such devices' manufacturer and model information, and optionally images (photographs). When the mobile application connects to the device management server, it checks whether an updated list of missing devices is available. If an updated list of missing devices is available, the mobile application downloads it on the server and maintain an offline copy to ensure that a list of missing devices is available even when not connected to the network. The mobile application can be configured to index the missing devices using the device serial number (or other similar unique identifier) to ensure that a device can be quickly located even if the list is very large.

The mobile device and the output device both have provisions to conduct short-range point-to-point communication, such as Bluetooth LE (or similar technology that allows automatic pairing). In the general case, the mobile device and the output device are unaware of each other while they are out of range. When the mobile device approaches the output device, software provisions within the mobile application on the mobile device automatically detect the presence of an output device when it reaches the short-range point-to-point communication range. Once in range, the (software on the) mobile device retrieves the identity of the device (using the serial number or similar unique identifier), and checks it against the missing devices list.

Once a missing device has been located, the mobile application (ii) records the location of the device and/or (ii) alerts the user, depending on the configuration determined by the administrator. For action (i), the mobile application records in persistent local storage some or all of the following information:
  the identity of the missing output device;
  the identity of any other output devices or beacon devices currently within range;
  the identity and timestamp delta (the amount of time elapsed prior to the detection of the missing output device) of the most recently detected output devices and/or beacon devices;
  GPS coordinates, if available.

Additionally, the mobile application tracks the next N (number set by the administrator) output devices and/or beacon devices detected after detection of the missing output device, and adds this information to the above.

For action (ii), the mobile application alerts the user (using, e.g., sound, vibration and/or other similar mechanism) that a missing device has been located nearby. If the user accepts the alert, the mobile application displays to the user information regarding the device, optionally including one or more photos. The user can then look in the immediate environment and attempt to identify the location of the device. If the user confirms the location of the device, the mobile application can optionally send an immediate alert to the helpdesk staff, or optionally instruct the user to place a voice call or text message to the helpdesk to alert them to the location of the missing device.

While the mobile application is running, it keeps track of the most recently detected output devices and/or beacon devices and the timestamps corresponding to the detection of the respective devices (i.e. the time of the greatest signal strength).

From time to time, e.g., based on a schedule defined by the device management server, the mobile application sends to the device management server the data corresponding to the detected missing devices. In the case that multiple mobile application send the device management server missing device data, the device management server consolidates the data, to increase accuracy, and computes (in manner similar to triangulation) the location based on a larger number of detected beacon devices and/or other devices.

Further, the device management server can publish the detected missing output device information, including nearby output device and beacon information, to the administrator. Such notifications can take one or more of the following forms:
  immediate notification to the administrator after an individual mobile application uploads missing output device data to the server;
  scheduled, regular notification of detected missing devices, including consolidated data from multiple mobile applications;
  on-demand reporting of detected missing devices, including consolidated data from multiple mobile applications.

The aforementioned specific embodiments are illustrative, and many variations can be introduced on these embodiments without departing from the spirit of the disclosure or from the scope of the appended claims. In addition, elements and/or features of different examples and illustrative embodiments may be combined with each other and/or substituted for each other within the scope of this disclosure and appended claims.

For example, the orders in which the steps are performed in the aforementioned methods and processes are not limited to those shown in the examples of FIGS. 7A, 7B, 8, 11 and 14, and may be switched as long as similar results are achieved. Also, it should be noted that the methods illustrated in the examples of FIGS. 7A, 7B, 8, 11 and 14 may be implemented using any of the systems of FIGS. 1A and 1B (or an equivalent).

What is claimed is:

1. A mobile application for tracking relocated or missing output devices that provide printing or scanning services, the mobile application including one or more programs of instructions embodied in a non-transitory computer readable medium and executable by a processor of a host terminal to configure the host terminal to comprise:
  a network communication module to communicate through a network interface of the host terminal with a device management server via a network, to obtain a missing devices list indicating for each missing device, manufacturer, device model and device identifier of the missing device, and store the missing devices list in a persistent local storage of the host terminal;
  a short-range communication module to communicate by short-range point-to-point communication with an output device to obtain the device identifier of the output device, when the output device is within a short-range communication range threshold of the host terminal;
  a device tracking module that stores a timestamp and the device identifier of the output device in a tracked device record when the output device is within the short-range communication range threshold of the host terminal, in the persistent local storage of the host terminal, compares the device identifier of the output device with the device identifier of each missing device on the missing devices list, and when the device tracking module determines that the output device corresponds to a missing device on the missing devices list, marks the output device as one of the missing devices in the tracked device record, and records an approximated location of the output device, from a position of the host terminal, in the tracked device record, wherein the device tracking module transmits the tracked device record to the device management server, upon demand of, or by pushing to, the device management server.

2. The mobile application as claimed in claim 1, wherein when the device tracking module determines that the output device corresponds to a missing device on the missing devices list, the device tracking module records identifiers of other output devices within the short-range communication range threshold of the host terminal, in addition to the timestamp, in the tracked device record of the output device.

3. The mobile application as claimed in claim 1, wherein when the device tracking module determines that the output device corresponds to a missing device on the missing devices list, the device tracking module records (i) an identifier of a most-recently detected other output device or beacon device detected prior to detection of the missing output device, and (ii) a timestamp difference between the timestamp associated with detection of the missing output device and the timestamp associated with detection of the most-recently detected other output device or beacon device, in the tracked device record of the output device.

4. The mobile application as claimed in claim 1, wherein the device tracking module tracks, and records in the tracked device record of the output device, the next N (N being a predetermined integer greater than zero) output devices detected through the short-range communication module after the device tracking module determines that the output device corresponds to a missing device on the missing devices list.

5. The mobile application as claimed in claim 1, further comprising:
an application user interface to output to a user of the host terminal, when the device tracking module determines that the detected output device corresponds to a missing device on the missing devices list, an alert that the detected output device nearby corresponds to a missing device on the missing devices list.

6. The mobile application as claimed in claim 5, wherein the application user interface permits the user of the host terminal to acknowledge receipt of the alert, and when receipt of the alert is acknowledged, the application user interface displays information including an image of the missing device and the approximated location of the detected output device.

7. The mobile application as claimed in claim 6, wherein the application user interface (UI) provides a UI part permitting the user of the host terminal to confirm that the detected output device nearby is the missing device shown in the image.

8. The mobile application as claimed in claim 7, wherein when the user of the host terminal operates the UI part to confirm that the detected output device nearby is the missing device shown in the image, the device tracking module transmits an immediate notification to an administrator to alert the administrator of the approximated location of the output device corresponding to a missing device on the missing devices list.

9. The mobile application as claimed in claim 6, wherein the application user interface displays a message requesting the user of the host terminal to notify an administrator, based on specified contact information, of the output device corresponding to a missing device on the missing devices list.

10. The mobile application as claimed in claim 1, wherein each time the mobile application connects to the device management server, the mobile application pushes tracked device records, if any, stored in the persistent local storage of the host terminal, to the device management server, and checks the device management server for updates to the missing devices list.

11. A device management system for tracking relocated or missing output devices that provide printing or scanning services, the system comprising:
a device management server that maintains a missing devices list indicating, for each missing device, manufacturer, device model and device identifier of the missing device; and
one or more host terminals, each host terminal hosting a mobile application including one or more programs of instructions embodied in a non-transitory computer readable medium and executable by a processor of the host terminal to configure the host terminal to comprise:
a network communication module to communicate through a network interface of the host terminal with the device management server via a network, to obtain the missing devices list from the device management server and store the missing devices list in a persistent local storage of the host terminal;
a short-range communication module to communicate by short-range point-to-point communication with an output device to obtain the device identifier of the output device, when the output device is within a short-range communication range threshold of the host terminal;
a device tracking module that stores a timestamp and the device identifier of the output device in a tracked device record when the output device is within the short-range communication range threshold of the host terminal, in the persistent local storage of the host terminal, compares the device identifier of the output device with the device identifier of each missing device on the missing devices list, and when the device tracking module determines that the output device corresponds to a missing device on the missing devices list, marks the output device as one of the missing devices in the tracked device record, and records an approximated location of the output device, from a position of the host terminal, in the tracked device record,
wherein the device tracking module transmits the tracked device record associated with the output device corresponding to a missing device on the missing devices list to the device management server, upon demand of, or by pushing to, the device management server.

12. The device management system as claimed in claim 11, wherein each time the device management server receives a tracked device record corresponding to a missing device on the missing devices list, the device management server computes an updated location of said missing device based on the information in the received tracked device record and other tracked device record received for said missing device from other devices.

13. The device management system as claimed in claim 11, wherein when the device management server receives the tracked device record of the output device corresponding to a missing device on the missing devices list, the device management server transmits an immediate notification to an administrator to alert the administrator of the approximated location of the output device corresponding to a missing device on the missing devices list.

14. The device management system as claimed in claim 11, wherein the device management server transmits, based on a regular notification schedule or in response to request from a client terminal, a summary of detected missing devices, including data consolidated from the mobile application of multiple host terminals.

15. The device management system as claimed in claim 11, wherein each time the mobile application connects to the device management server, the device management server pushes an updated missing devices list to the mobile application and obtains from the mobile application tracked device records, if any, stored in the persistent local storage of the host terminal hosting the mobile application.

16. A method performed by a device management system for tracking relocated or missing output devices that provide printing or scanning services, the method comprising:
  communicating by a host terminal, via a network communication module through a network interface of the host terminal, hosting a mobile application with a device management server that maintains a missing devices list indicating, for each missing device, manufacturer, device model and device identifier of the missing device, to obtain the missing devices list from the device management server and store the missing devices list in a persistent local storage of the host terminal;
  communicating by short-range point-to-point communication by the host terminal hosting the mobile application with an output device to obtain the device identifier of the output device, when the output device is within a short-range communication range threshold of the host terminal;
  storing, by a device tracking module of the host terminal, a timestamp and the device identifier of the output device in a tracked device record when the output device is within the short-range communication range threshold of the host terminal, in the persistent local storage of the host terminal;
  comparing, by the device tracking module of the host terminal, the device identifier of the output device with the device identifier of each missing device on the missing devices list, and when the mobile application determines that the output device corresponds to a missing device on the missing devices list, marking the output device as one of the missing devices in the tracked device record and recording an approximated location of the output device, from a position of the host terminal, in the tracked device record; and
  transmitting by the mobile application the tracked device record associated with the output device corresponding to a missing device on the missing devices list to the device management server, upon demand of, or by pushing to, the device management server.

17. The method as claimed in claim 16, further comprising:
  each time the mobile application connects to the device management server, (i) pushing by the mobile application tracked device records, if any, stored in the persistent local storage of the host terminal, to the device management server, and (ii) checking by the mobile application the device management server for updates to the missing devices list.

18. The method as claimed in claim 16, further comprising:
  transmitting by the device management server, when the device management server receives the tracked device record of the output device corresponding to a missing device on the missing devices list, an immediate notification to an administrator to alert the administrator of the approximated location of the output device corresponding to a missing device on the missing devices list.

19. The method as claimed in claim 16, further comprising:
  transmitting by the device management server, based on a regular notification schedule or in response to request from a client terminal, a summary of detected missing devices, including data consolidated from the mobile application of multiple host terminals.

20. The method as claimed in claim 16, further comprising:
  each time the mobile application connects to the device management server, (i) pushing by the device management server an updated missing devices list to the mobile application, and obtaining by the device management server from the mobile application tracked device records, if any, stored in the persistent local storage of the host terminal hosting the mobile application.

* * * * *